(12) United States Patent
Groves et al.

(10) Patent No.: US 8,893,013 B1
(45) Date of Patent: Nov. 18, 2014

(54) METHOD AND APPARATUS FOR PROVIDING A HYBRID COMPUTING ENVIRONMENT

(71) Applicant: Teradici Corporation, Burnaby (CA)

(72) Inventors: Randall Dean Groves, Austin, TX (US); David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 0 days.

(21) Appl. No.: 14/049,923

(22) Filed: Oct. 9, 2013

Related U.S. Application Data

(63) Continuation of application No. 12/287,889, filed on Oct. 14, 2008.

(60) Provisional application No. 60/979,309, filed on Oct. 11, 2007.

(51) Int. Cl.
   *G06F 15/16* (2006.01)
   *G06F 9/54* (2006.01)

(52) U.S. Cl.
   CPC .................................... *G06F 9/54* (2013.01)
   USPC ........................................................ 715/740

(58) Field of Classification Search
   USPC .................................................... 715/740
   See application file for complete search history.

(56) References Cited

U.S. PATENT DOCUMENTS

| | | | |
|---|---|---|---|
| 6,370,606 B1 | 4/2002 | Bonola | |
| 2004/0068666 A1 | 4/2004 | Tosey | |
| 2004/0213290 A1 | 10/2004 | Johnson et al. | |
| 2005/0104889 A1* | 5/2005 | Clemie et al. | 345/522 |
| 2005/0240685 A1 | 10/2005 | Keys | |
| 2006/0026655 A1 | 2/2006 | Perez | |
| 2007/0033155 A1 | 2/2007 | Landsman | |
| 2007/0239921 A1* | 10/2007 | Toorians et al. | 710/306 |
| 2008/0086540 A1* | 4/2008 | Scott et al. | 709/217 |
| 2009/0172705 A1* | 7/2009 | Cheong | 719/321 |
| 2009/0327962 A1 | 12/2009 | Betts-LaCroix et al. | |

OTHER PUBLICATIONS

"Device Driver", downloaded from: http://web.archive.org/web/20060612225656/http://en.wikipedia.org/wiki/device$_{13}$ driver, 4 pgs.

"Thin Client", downloaded from: http://web.archive.org/web/20050707084129/http://en.wikipedia.org/wiki/Thin_client, published on Jul. 7, 2005, 4 pgs.

(Continued)

*Primary Examiner* — Peiyong Weng
(74) *Attorney, Agent, or Firm* — Moser Taboada

(57) ABSTRACT

Method and apparatus for computing resources. One embodiment of the method comprises executing a first application on a computer CPU sub-system during CPU sub-system operation; controlling execution of the first application by an interface coupled to the computer and selectively coupled to the CPU sub-system; generating, by the first application and in response to an event from a user device of the interface, a first image for display; controlling, by the user device and during suspension of the CPU sub-system operation, execution of a second application, on a server coupled to the computer, that generates a second image compressed and transmitted as a compressed image by the server, the interface coupled to the server by a resource selector of the computer, a remote bridge of the computer and the IP network; receiving and decoding, via the remote bridge and during the suspension, the compressed image to generate a display image.

18 Claims, 12 Drawing Sheets

(56) References Cited

OTHER PUBLICATIONS

Iogear, "USB Laptop KVM Switch", User Manual, 2008, Model No. GCS661U, Part No. M1069, Irvine, CA, USA, 36 pgs.

T. Hirofuchi et al., "USB/IP—a peripheral Bus extension for device sharing over IP network," USENIX Association, FREENIX Track: 2005 USENIX Annual Technical Conference, pp. 47-60.

* cited by examiner

METHOD AND APPARATUS FOR PROVIDING A HYBRID COMPUTING ENVIRONMENT

CROSS-REFERENCE TO RELATED APPLICATIONS

This application is a continuation of co-pending U.S. patent application Ser. No. 12/287,889, entitled "Method and Apparatus for Providing a Hybrid Computing Environment", filed Oct. 14, 2008, which claims benefit of U.S. provisional patent application Ser. No. 60/979,309 entitled "Mobile Computing Methods and Apparatus", filed Oct. 11, 2007, and has related subject matter to U.S. patent application Ser. No. 11/688,107 entitled "Methods and Apparatus for Managing a Shared GUI", filed on Mar. 19, 2007. Each of the aforementioned related patent applications is herein incorporated by reference.

BACKGROUND OF THE INVENTION

1. Field of the Invention

The invention relates generally to remote computing environments and, more particularly, apparatus and a method for selectively connecting a user interface of a computer to a local computing resource when operating offline or bridging the user interface to an online computing resource.

2. Background

Modern work habits require an ability of users to utilize computer resources in various environments, i.e., desktop, mobile, remote, and the like. As such, users are demanding the ability to flexibly utilize their office computer resources. One such technique that supports this flexibility is the use of virtual computing environments.

Products such as ACE, Kidaro and Moka5™ LivePC maintain a "permanent" version of an end user's virtual machine on a server. The virtual machine can migrate to other remote devices, but processing of the virtual machine moves to that other remote device. Typically, such virtual systems limit the virtual machine to being "checked out" to one device at a time to maintain data consistency. Consequently, using a terminal device, a user can use the computing resources of a virtual machine via wide area network or local area network connections.

In other remote computing environments, a user utilizes a local keyboard, video, mouse (KVM) that is selectively coupled to a local computer or a remote computer via an IP network. More specifically, KVM over IP products, such as those manufactured by the likes of AVOCENT Corporation, comprise a switch enabled to direct a sub-set of user interface signals (Keyboard, Video and Mouse) to either a local computer or another computer on an IP network. These systems provide limited bridging of KVM and no bridging of peripherals to the various computers.

Therefore, there is a need in the art for a method and apparatus that enables a user interface to be selectively connected to either local computing resource or a remote computing resources.

SUMMARY OF THE INVENTION

Embodiments of the present invention generally relate to a method and apparatus for computing resources substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
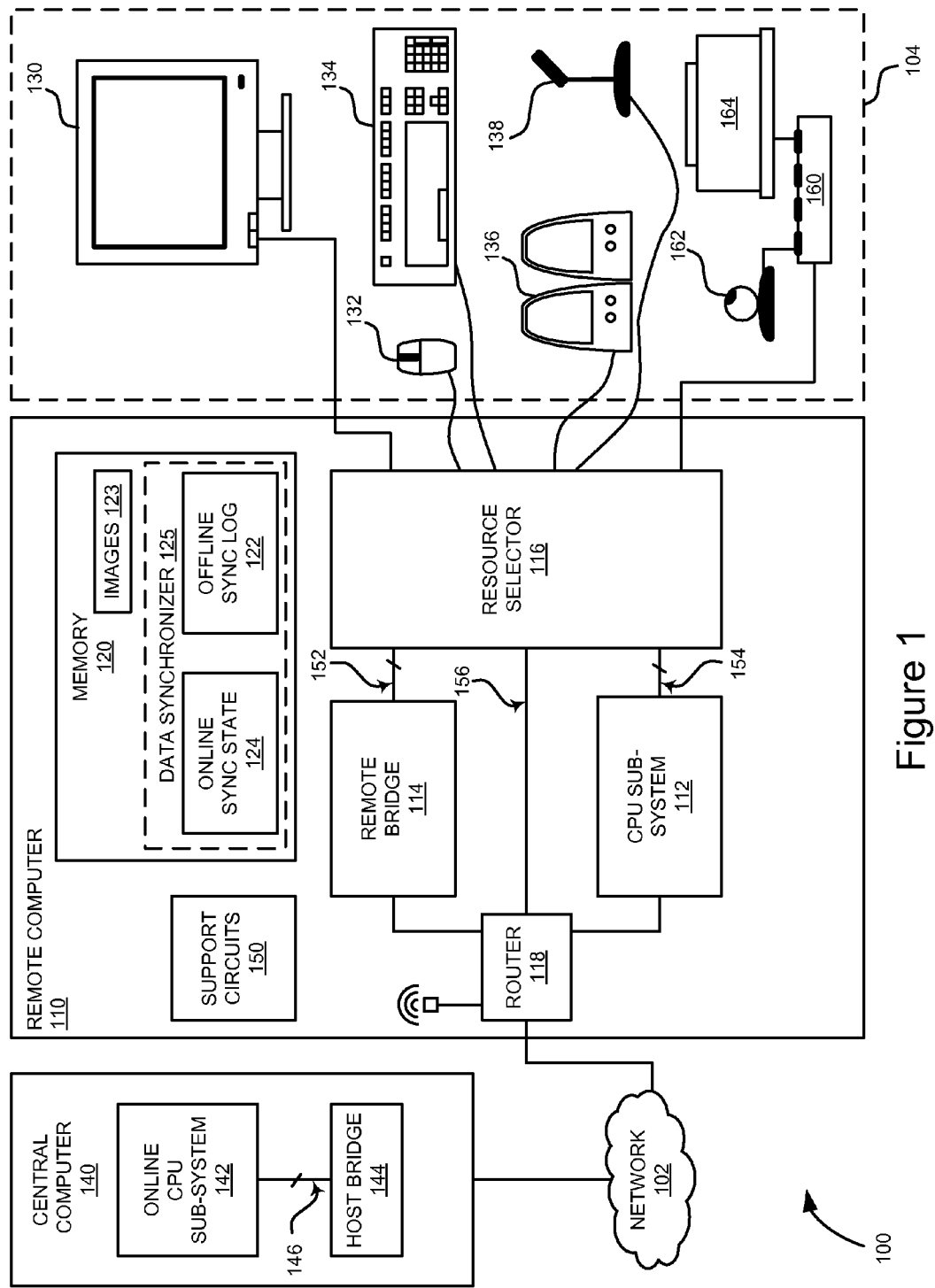
FIG. 1 illustrates selected details of an embodiment of a system comprising a remote computer enabled to operate offline or communicate with a central computer using a network.

FIG. 1 illustrates selected details of an embodiment of a system 100 comprising a remote computer 110 such as any of several mobile or non-portable computing apparatus including a laptop computer, tablet computer, handheld computer, desktop computer, computing terminal or other form of mobile or non-portable computing appliance enabled to operate offline and/or communicate with a central computer 140 such as a computer server, a workstation or a desktop computer using a network 102. The network 102 comprises a communication system (e.g., the Internet, LAN, WAN, and the like) that connects computer systems completely by wire, cable, fiber optic, and/or wireless links facilitated by various types of well-known network elements, such as hubs, switches, routers, and the like. In one embodiment the network 102 employs various well-known protocols (e.g., TCP/IP and the like) to communicate information amongst the network resources. For example, in various embodiments, the network 102 utilizes part of the Internet.

User interface 104 is employed to provide user interactivity for a user utilizing remote computer 110 and/or central computer 140. In various embodiments, user interface 104 comprises display 130, various Human Interface Device (HID) devices including mouse 132 and keyboard 134 (referred to herein as "input/output devices") in addition to various computer peripheral devices including analog speakers 136 and microphone 138, USB hub 160 connected webcam 162, printer or scanner 164 and the like. In some embodiments, one or more devices of user interface 104 are mechanically integrated with remote computer 110 such as a laptop computer embodiment comprising integrated display 130, keyboard 134, hub 160, webcam 162 and audio devices. In some embodiments, one or more devices are mechanically independent of computer 100 such as a stand-alone display 130 and mouse 132 coupled to remote computer 110 using wired or wireless communication methods. User interface 104 of FIG. 1 serves to depict just one combination of user interface devices supported by the present invention and places no limitations on other contemplated configurations. For example, in various alternative embodiments, user interface 104 comprises a minimal set of devices such as display and single HID device. In other alternative embodiments, user interface 104 comprises a different combination of devices such as multiple displays employed in combination with a mouse and a keyboard. In other alternative embodiments, user interface 104 comprises one or more other peripheral device types such as scanners, biometric devices, Mass Storage Devices (MSD), touch sensitive HID devices, motion sensitive HID, USB audio devices or the like, integrated with, or coupled to remote computer 110 by suitable peripheral device interfaces such as Universal Serial Bus (USB), BLUETOOTH, FIREWIRE, and/or PS/2.

Resource selector 116 of computer 110 selectively couples user interface 104 to online CPU sub-system 142 (with support from bridging components including user interface (UI) link 152, remote bridge 114, router 118, network 102, and host bridge 144, together referred to as a remote processing resource) or to CPU sub-system 112 of computer 110 (referred to as a local processing resource) using UI link 154. In various embodiments, resource selector 116 comprises means for switching the source of an image presented on display 130 between the bridged video stream provided by central computer 140 and the video stream provided by CPU sub-system 112. In select alternative embodiments, resource selector 116 comprises means for generating a composite display image by combining concurrent offline and online video streams. Resource selector 116 further comprises means for switching user interface signals (such as USB, audio, BLUETOOTH or FIREWIRE peripheral device signals) associated with user interface 130 to either CPU sub-system 112 or remote bridge 114 in order to bridge the user interface signals to central computer 140.

Figure 5:
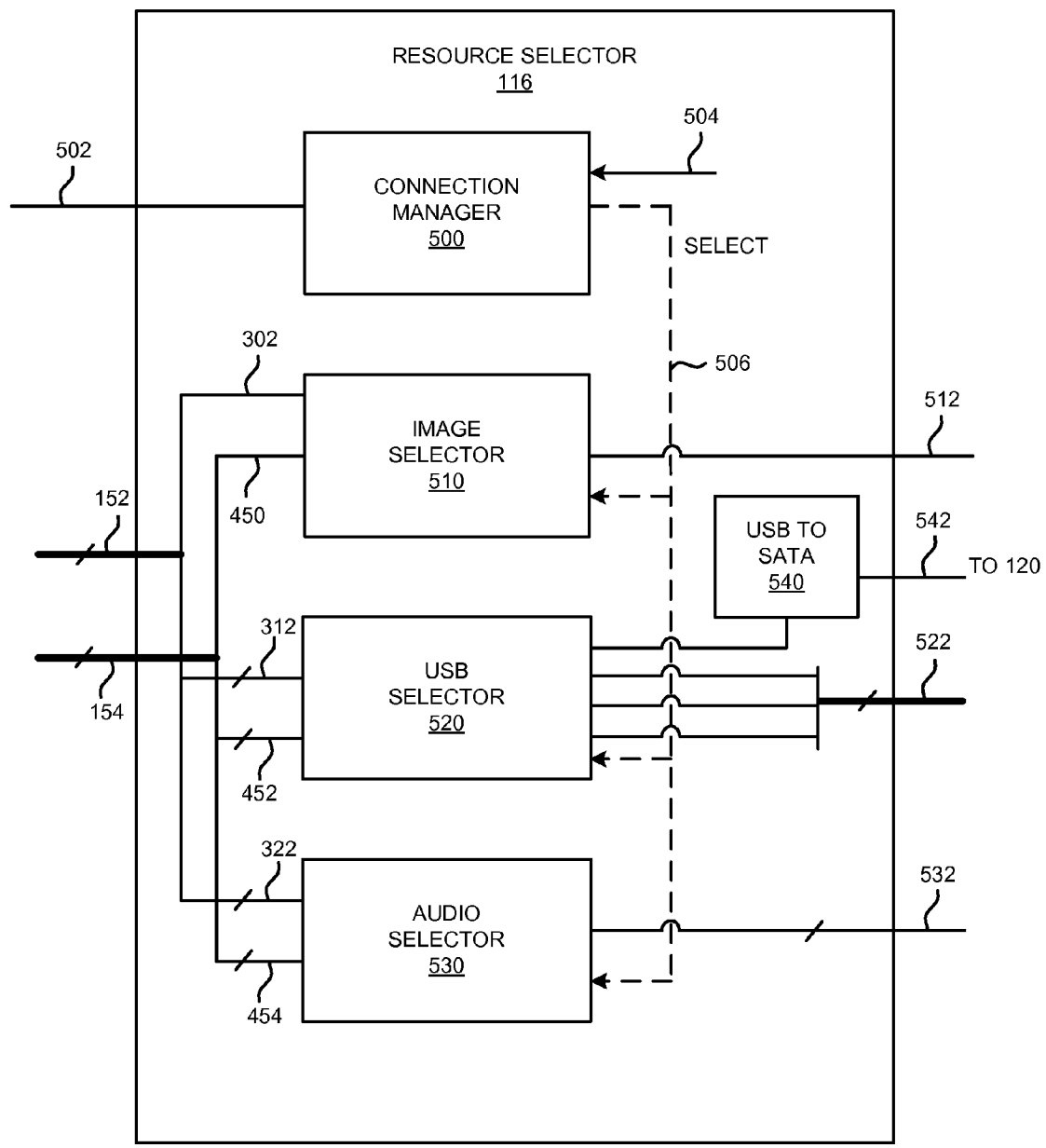
FIG. 5 illustrates selected details of an embodiment of a resource selector enabled to selectively couple a user interface to an online CPU sub-system, an offline CPU sub-system or both.

In select embodiments, resource selector 116 uses a connection management procedure for determining whether user interface 104 is to couple to sub-system 112 (a portion of local processing resources) or to computer 140 (a portion of remote processing resources). For example, the connection management procedure utilizes connection 156 to probe the availability of central computer 140 on network 102, evaluates the state of a selector switch (e.g., an externally accessible mechanical selector or dedicated key on keyboard 134 wired to connection management logic associated with selector 116) or traps a keyboard hotkey sequence from a keyboard device. In some such cases, user interface 104 is automatically coupled to central computer 140 when available. In other such embodiments, automatic coupling is overridden by administrative policy enforcement (e.g., from a management server) or a user (e.g., using a hotkey sequence). In some embodiments, resource selector 116 comprises means for selectively determining which devices of user interface 104 should be coupled to sub-system 112 and which devices should be coupled to computer 140, for example, by monitoring connections and maintaining state information associated with previous connections. An embodiment of resource selector 116 is depicted in FIG. 5 and described in the corresponding section of this specification.

Memory 120, typically coupled to resource selector 116 by a bus such as a USB bus or a Serial Advanced Technology Attachment (SATA) bus, is enabled to store synchronization information that facilitates the synchronization of data when transitioning between offline and online computing environments. In an alternative embodiment, memory 120 is coupled to router 118, for example using a Network Attached Storage (NAS) or Storage Area Network (SAN) connection, which enables concurrent access by CPU sub-system 112 and CPU sub-system 142. Memory 120 comprises non-volatile computer-readable media such as one or more of: electronic, magnetic, optical, and/or other types of non-volatile storage media including SATA- or USB-compatible flash memory, EEPROM, hard drive, tape, magneto-optical disks or the like. In some embodiments, memory 120 comprises a combination of volatile memory such as DRAM, or SRAM and non-volatile memory to facilitate the requirements of rapid read/write accessibility during operation as well as data resilience when computer 110 is powered down. In an embodiment, memory 120 stores various data structures such as offline synchronization log 122 and online synchronization state 124 that function with software processes (described below) that form a data synchronizer 125. In other embodiments, memory 120 stores one or more software application environment images 123 such as an ACE 'Package' from VMWARE corporation (typically comprising operating system, applications, lifecycle policies and security information), a KIDARO desktop image from MICROSOFT corporation or a LIVEPC virtual computer image from MOKAFIVE corporation.

Offline synchronization log 122 includes one or more data structures for storing changes to the offline software application environment (executing local to CPU sub-system 112), including information associated with file changes, configuration updates, suspend files, image snapshots and changes to runtime settings. In various embodiments, CPU sub-system 112 maintains log 122, for example by recording changes to the offline software application environment during operation and upon termination of computing sessions. Online CPU sub-system 142 accesses log 122 at the beginning of an online session, updates the online software application environment (executing local to CPU sub-system 142) and records a reference marker for the next synchronization. Online synchronization state 124 comprises one or more data structures for maintaining the status of the online software application environment, including duplicate data structures to those stored at CPU sub-system 142 and/or information associated with file changes, configuration updates, suspend files, image snapshots and changes to runtime settings. In various embodiments, online CPU sub-system 142 maintains status 124, for example, by remotely accessing memory 120 and maintaining a duplicate state of the online software application environment during online operation. At the beginning of an offline session, CPU sub-system 112 accesses change history information from synchronization state 124 and updates the offline software application environment (executing local to CPU sub-system 112), including updating, replacing or accessing duplicate files changed during the most recent online session.

When system 100 is configured for offline operation (by resource selector 116), user interface 104 is coupled to CPU sub-system 112. Sub-system 112 provides computing resources including processor, memory and device interfaces for operating an offline software application environment, typically comprising hypervisor, operating system, device drivers and application software. In some embodiments, sub-system 112 is coupled to network 102 by router 118, thereby enabling connections with well known resources such as computers, servers and the Internet. An embodiment of CPU sub-system 112 is described below in association with FIG. 4.

Router 118 comprises a network interface enabled to couple offline CPU sub-system 112 and/or remote bridge 114 to network 102 using a communication protocol such as a wired Ethernet variant or a suitable wireless protocol such as IEEE 802.11 or WIMAX. In an embodiment, router 118 comprises well known switching and/or routing components such as a BROADCOM BCM53115 Gigabit Ethernet Switch device coupled to a BROADCOM BCM4717 802.11n router device, supported by well known support circuits such as memory and an RJ-45 connector. In an embodiment, routing and wireless functions are coupled to an RJ-45 connector and the routing assembly is fed to either CPU sub-system 112 or remote bridge 114 using an Ethernet switching device such as model number PI3L01D 10/100/1000 Copper multiplexer from PERICOM corporation, dependent on the current active resource determined by resource selector 116.

When system 100 is configured for online operation (by resource selector 116), host bridge 144 operates in conjunction with remote bridge 114 to couple user interface 104 to online CPU sub-system 142. Embodiments of host bridge 144 and remote bridge 114 are described in association with FIG. 2 and FIG. 3 herein.

In various embodiments, remote computer 110 further includes support circuits 150 comprising at least one of power supplies, clock circuits, data registers and I/O interfaces. In other embodiments, support circuits 150 includes at least one of address, control, interrupt and/or data connections, controllers, data buffers, drivers, repeaters, and receivers to enable appropriate communications between the various elements of remote computer 110 including CPU sub-system 112, remote bridge 114, resource selector 116, router 118, memory 120 and user interface 104.

In an embodiment, central computer 140 comprises a well known blade server, blade PC (e.g., BLADECENTER HC10 from IBM corporation or R1350 from CLEARCUBE corporation) or workstation motherboard (e.g., PRECISION RS400 from DELL corporation) including CPU sub-system 142 coupled to a plug-in card or daughter card embodiment of host bridge 144 by link 146, for example comprising a PCI-EXPRESS plug-in card and a digital video bus such as a Digital Visual Interface (DVI) or DISPLAYPORT bus. Sub-system 142 provides computing resources including processor, memory and device interfaces for operating an online software application environment. In a typical configuration, the online software application environment comprises operating system (such as a WINDOWS operating system from MICROSOFT, Inc. for example WINDOWS XP or WINDOWS VISTA, a LINUX operating system available from many vendors or a UNIX operating system, also available from many vendors), device drivers and application software. In some embodiments, sub-system 142 comprises virtualization software such as a Hypervisor (such as ESX SERVER from VMWARE Corporation, XENSERVER from CITRIX Corporation, or HYPER-V from MICROSOFT Corporation) and a set of virtual machines (VMs) of which one of the VMs is assigned to user interface 104. In some such embodiments, sub-system 142 incorporates hardware-based virtualization management features such as emulated register sets, address translation tables, interrupt tables, PCI I/O virtualization (IOV) and I/O memory management unit (IOMMU) to enable efficient data transfer between host bridge 144 and protected memory areas accessible by the virtual machine associated with user interface 104.

System 100 depicts just one combination of system architectures supported by the present invention and places no limitations on other contemplated configurations. For example, in various alternative embodiments, system 100 comprises multiple central computers 140 coupled to network 102 and utilized for online computing.

Figure 2:
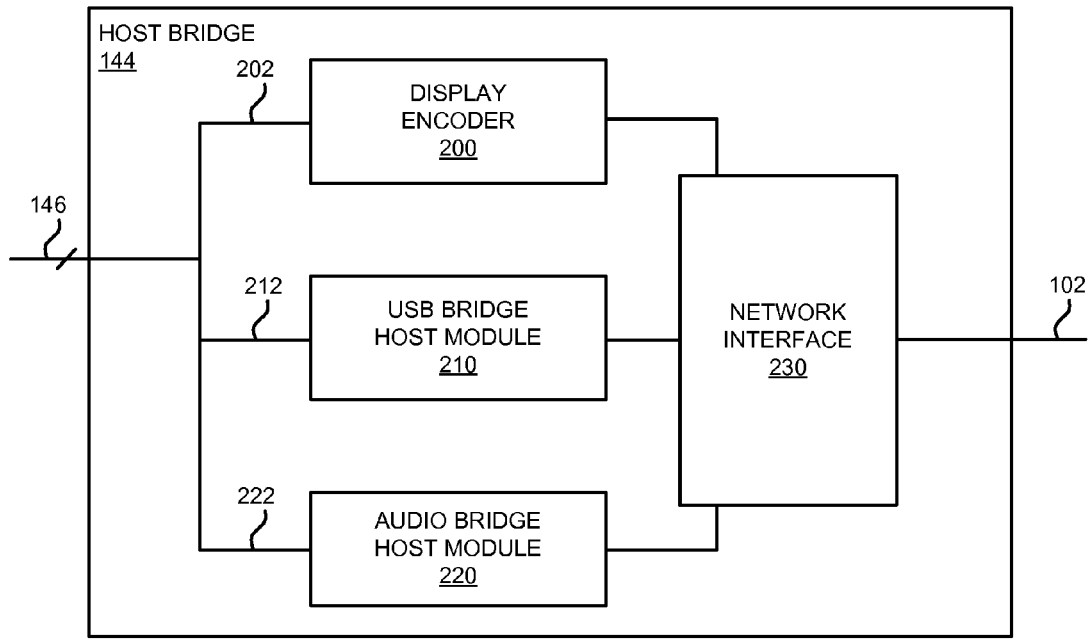
FIG. 2 illustrates selected details of an embodiment of a host bridge enabled operate in conjunction with a remote bridge to communicate user interface data between an online CPU sub-system of a central computer and a remote computer.

FIG. 2 illustrates selected details of an embodiment of a host bridge 144 of FIG. 1 enabled to operate in conjunction with a remote bridge 114 (of FIG. 1) to communicate user interface data between online CPU sub-system 142 of central computer 140 and a remote computer 110 (all depicted in FIG. 1). Host bridge 144 comprises display encoder 200, USB bridge host module 210 and audio bridge host module 220, collectively coupled to network 102 of FIG. 1 by network interface 230.

In select embodiments, display encoder 200 includes a display compression engine coupled to CPU sub-system 140 (of FIG. 1) by a digital video bus 202 such as a DVI bus, DISPLAYPORT bus or the like associated with link 146. Encoder 200 encodes one or more display images (such as a desktop display image) generated by CPU sub-system 142 and communicates the encoded image to a corresponding display decoder of remote bridge 114 in FIG. 1. An embodiment of encoder 200 is disclosed in U.S. patent application Ser. No. 11/532,865 entitled "Methods and Apparatus for Encoding a Digital Video Signal", incorporated by reference in its entirety herein. In other various embodiments, at least part of display encoder 200 is implemented as display encoding software executed by CPU sub-system 142. In some such embodiments, encoder 200 is coupled to network interface 230 by a system bus such as a PCI, PCI-EXPRESS or HYPERTRANSPORT bus associated with CPU sub-system 142.

In select embodiments, USB bridge host module 210 comprises a bridged USB controller with USB register interface, USB encoder elements and USB decoder elements coupled to CPU sub-system 142 (of FIG. 1) by a system bus 212 such as a PCI or PCI-EXPRESS bus associated with link 146 to CPU sub-system 142. In an outbound direction toward user interface 104 (FIG. 1), USB bridge host module 210 encodes one or more USB streams generated by CPU sub-system 142 and communicates the encoded USB data to a corresponding USB decoder of remote bridge 114 in FIG. 1. In an inbound direction toward CPU sub-system 142 USB bridge host module 210 receives and decodes one or more USB streams communicated from a corresponding USB encoder of remote bridge 114 in FIG. 1. An embodiment of USB bridge host module 210 is disclosed in U.S. patent application Ser. No. 11/278,378 entitled "System and Methods for Bridging a USB Connection", incorporated by reference in its entirety herein. In other various embodiments, at least part of USB bridge host module 210 is implemented as USB encoding/decoding software executed by CPU sub-system 142, for example utilizing well known USB over IP software protocols known to the art.

In select embodiments, audio bridge host module 220 comprises a bridged audio controller with an audio register interface such as a High Definition (HD) audio interface specified by INTEL corporation, audio encoder and decoder elements coupled to CPU sub-system 142 (of FIG. 1) by a system bus 222 such as a PCI or PCI-EXPRESS bus associated with link 146 to CPU sub-system 142. In an outbound direction toward user interface 104 (of FIG. 1), audio bridge host module 220 encodes one or more audio streams generated by CPU sub-system 142 and communicates the encoded audio data to a corresponding audio decoder of remote bridge 114 in FIG. 1. In an inbound direction toward CPU sub-system 142, audio bridge host module 220 receives and decodes one or more audio streams communicated from a corresponding audio encoder of remote bridge 114 in FIG. 1. An embodiment of audio bridge host module 220 is disclosed in U.S. patent application Ser. No. 11/534,600 entitled "Methods and Apparatus for Bridging an Audio Controller" incorporated by reference in its entirety herein. In other various embodiments, at least part of audio bridge host module 220 is implemented as audio encoding/decoding software executed by CPU sub-system 142, for example utilizing well known audio-over-IP software protocols known to the art.

In an embodiment, network interface 230 sends and receives electrical, electromagnetic, and/or optical signals that carry data, such as digital data streams, representing various types of information including video, USB and/or audio information. In an embodiment, network interface 230 multiplexes data frames, applies zero padding for word alignment, inserts framing bits, and appends transport specific headers (e.g., IP and Ethernet) packet header information such as stream identity, payload size, timing information and command information associated with display, USB and audio streams to outbound packets on network 102 (of FIG. 1). Inbound packets from network 102 are stripped of IP and Ethernet headers before being passed to appropriate decoding functions for further processing. In some embodiments, interface 230 is a shared-use network interface of CPU sub-system 142 comprising user-interface data and other network data related to sub-system 142.

In other embodiments, host bridge 144 comprises a bridged Serial Advanced Technology Attachment (SATA) controller host module enabled to communicated with a corresponding bridged SATA remote module of remote bridge 114 in FIG. 1 used to access and store data such as application environment changes, file updates and changed settings in memory 120. In some embodiments, a SATA bridge is used to upload a boot image from memory 120 in FIG. 1. An embodiment of a bridged peripheral controller such as a bridged SATA controller is disclosed in U.S. patent application Ser. No. 11/694,756 entitled "Selective Routing of Peripheral Device Signals".

Figure 3:
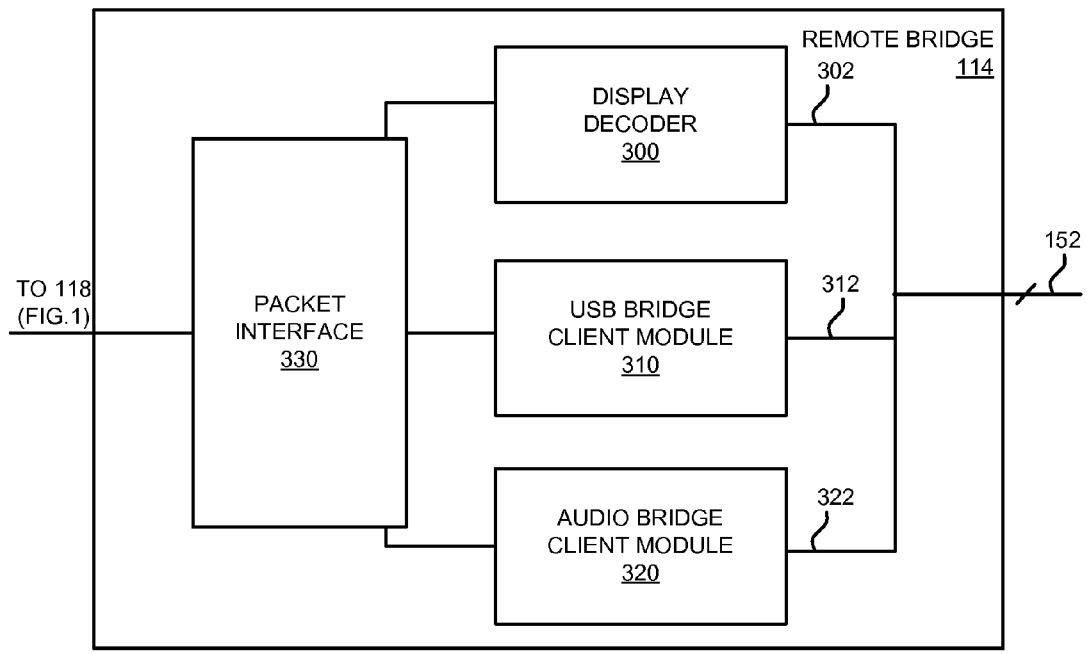
FIG. 3 illustrates selected details of an embodiment of a remote bridge enabled operate in conjunction with a host bridge to communicate user interface data between a remote computer and an online CPU sub-system of a central computer.

FIG. 3 illustrates selected details of an embodiment of a remote bridge 114 of FIG. 1 enabled operate in conjunction with a host bridge 144 to communicate user interface data between a user interface 104 and online CPU sub-system 142 of central computer 140 (all depicted in FIG. 1). Remote bridge 114 comprises display decoder 300, USB bridge client module 310 and audio bridge client module 320, collectively coupled to router 118 and network 102 (of FIG. 1) by packet interface 330.

In select embodiments, display decoder 300 comprises a display de-compression engine with decoding functions complementary to encoding functions performed by display encoder 200 in FIG. 2. Display decoder 300 receives packets of encoded display information and decodes one or more display images (such as a desktop display image) received from CPU sub-system 142 (ref. FIG. 1) and generates a video signal 302 such as a DVI, Digital Video Out (DVO), DISPLAYPORT, Low Voltage Differential Signaling (LVDS), or Video Graphics Array (VGA) display signal. An embodiment of decoder 300 is disclosed in U.S. patent application Ser. No. 11/532,865 entitled "Methods and Apparatus for Encoding a Digital Video Signal", incorporated by reference in its entirety herein. According to other various embodiments, decoder 300 includes one or more of: a programmable embedded digital media processor, such as a TMS320DM64x DAVINCI digital media processor available from Texas Instruments; a PNX1300 NEXPERIA processor from NXP Semiconductors; a Field Programmable Gate Array (FPGA) or an Application Specific Integrated Circuit (ASIC) configured, at least in part, as a logic circuit to perform image decoding; other processors and/or electronic hardware suitable for performing image decoding; and any combination of the foregoing. In an exemplary embodiment, display decoder 300 generates a first DVO signal which is converted to a Low Voltage Differential Signal 302 (e.g., using a transmitter such as model number CH7305 from CHRONTEL corporation and coupled to a video select function of resource selector 116 in FIG. 1 and a second DVO signal which is converted to a VGA signal (e.g., using a VGA transmitter such as model number CH7301 from CHRONTEL corporation).

In various embodiments, USB bridge client module 310 comprises a bridged USB controller with USB encoder function, USB decoder function and USB bus interface components such as root hub and PHYs, selectively coupled to one or more USB devices of user interface 104 via resource selector 116 in FIG. 1. In an exemplary embodiment, USB bridge remote module 310 provides four USB busses 312 for device termination, such as termination of mouse 132, keyboard 134 and hub 160 all depicted in FIG. 1. In an outbound direction toward user interface 104 (FIG. 1), USB bridge client module 310 decodes one or more USB streams encoded by USB bridge host module 210 in FIG. 2 and communicates the decoded USB data to a USB device. In an inbound direction toward CPU sub-system 142 (ref. FIG. 1) USB bridge client module 310 receives and encodes one or more USB streams from connected devices and communicates the encoded data over network 102 (FIG. 1) to USB bridge host module 210 in FIG. 2. An embodiment of USB bridge client module 310 is disclosed in U.S. patent application Ser. No. 11/278,378 entitled "System and Methods for Bridging a USB Connection", incorporated by reference in its entirety herein. In other various embodiments, at least part of USB bridge client module 310 is implemented as USB encoding/decoding software executed, for example, by an embedded controller or CPU sub-system 112 (FIG. 1) utilizing USB/IP protocols known to the art.

In various embodiments, audio bridge client module 320 comprises a bridged audio controller with audio encoder and decoder elements coupled to corresponding encoding and decoding functions of audio bridge host module 220 in FIG. 2. Client module 320 terminates audio bundle 322 comprising well known audio signals such as line-in, line-out, Sony/Philips Digital Interconnect Format (S/PDIF), headphone and microphone signals. In an outbound direction toward user interface 104 (ref. FIG. 1), audio bridge client module 320 decodes one or more output audio streams received from audio bridge host module 220 in FIG. 2 and communicates one or more audio signals to audio devices (such as speakers 136) of user interface 104 in FIG. 1. In an inbound direction toward CPU sub-system 142 (ref. FIG. 1), audio bridge client module 320 receives and encodes one or more input audio signals from one or more input devices such as microphone 138 in FIG. 1. The audio content is encoded by client module 320 and communicated to corresponding host module 220 for decoding and further communication to CPU sub-system 142. An embodiment of audio bridge client module 320 is disclosed in U.S. patent application Ser. No. 11/534,600 entitled "Methods and Apparatus for Bridging an Audio Controller" incorporated by reference in its entirety herein. In other various embodiments, at least part of audio bridge client module 320 is implemented as audio encoding/decoding software executed, for example, by an embedded controller or offline CPU sub-system 112 (FIG. 1).

In an embodiment, packet interface 330 sends and receives packets comprising various types of information including video, USB and/or audio information to router 118 in FIG. 1. In an embodiment, packet interface 330 de-multiplexes data frames, removes zero padding and framing bits, and removes transport headers, stream identity, payload size, timing information and command information associated with display, USB and audio streams from packets received from computer 140 (FIG. 1). User Interface-bound packets passed to appropriate decoding functions for further processing. Conversely, in the direction towards computer 140, packet interface 330 multiplexes data frames, applies zero padding for word alignment, inserts framing bits, and packet header information such as stream identity, payload size, timing information and command information associated with USB and audio streams bound for the central computer.

In an alternative embodiment, remote bridge 114 further comprises a bridged Serial Advanced Technology Attachment (SATA) controller client module enabled to communicate with a corresponding bridged SATA host module of host bridge 144 in FIG. 1 in order to store data such as application environment changes, file updates and changed settings in memory 120. An embodiment of such a bridged peripheral controller is disclosed in U.S. patent application Ser. No. 11/694,756 entitled "Selective Routing of Peripheral Device Signals".

Figure 4:
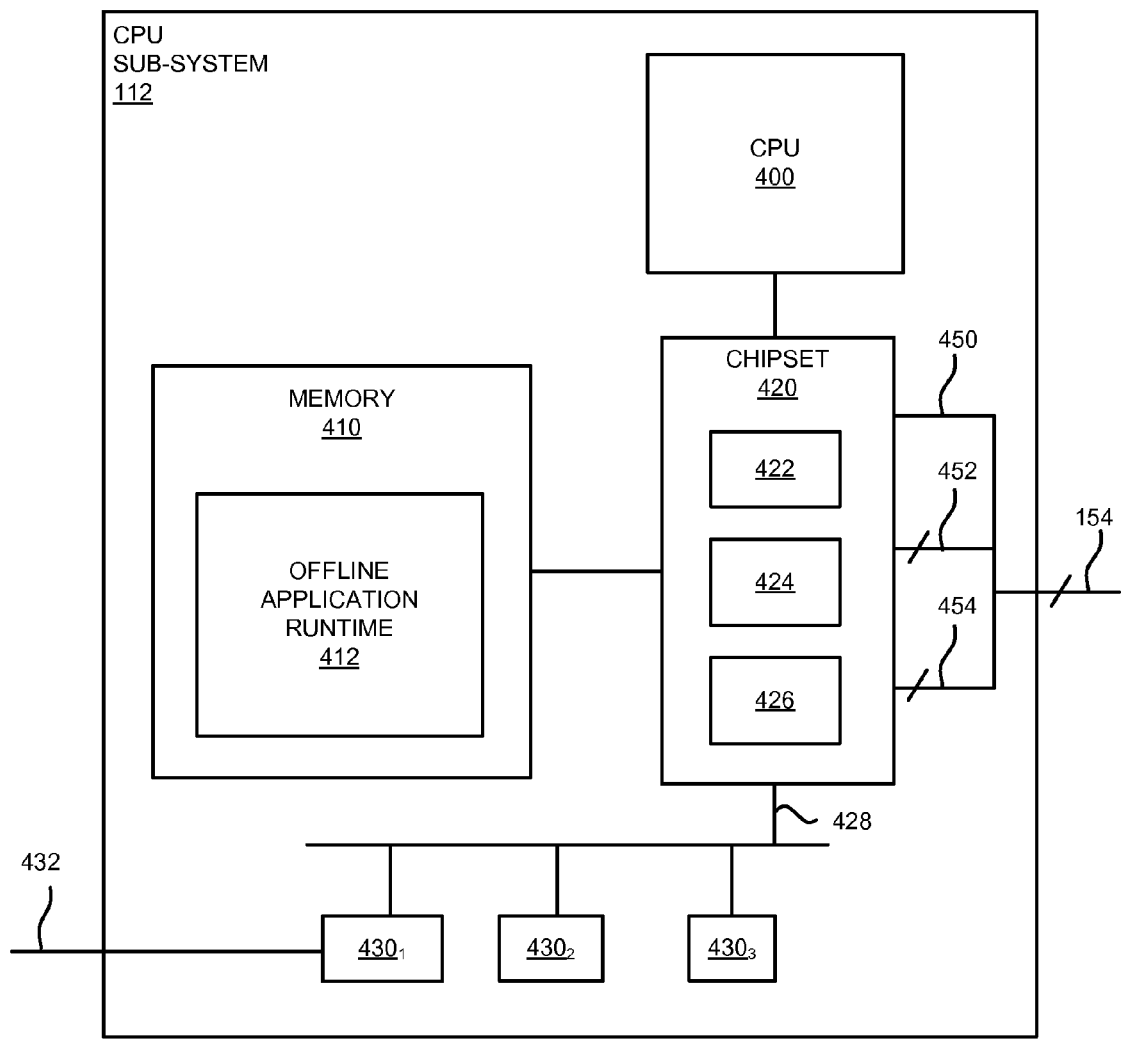
FIG. 4 illustrates selected details of an embodiment of a CPU sub-system enabled to operate offline and provide local computing resources.

FIG. 4 illustrates selected details of an embodiment of CPU sub-system 112 of FIG. 1 enabled to operate offline by providing local computing resources (such as a CPU and memory) configured to execute a software application environment in addition to providing various interfaces for terminating user interface devices associated with user interface 104 in FIG. 1. Sub-system 112 depicted comprises Central Processing Unit (CPU), north bridge, south bridge, Graphics Processing Unit (GPU), memory controllers, bus bridges and the like. Examples of a suitable CPU 400 include 32-bit, 64-bit or other CPU such as TURION, PHENOM or GEODE class microprocessors manufactured by ADVANCED MICRO DEVICES; CELERON, CENTRINO or CENTRINO2 class processors manufactured by INTEL; SPARC microprocessors manufactured by SUN MICROSYSTEMS, or microprocessor such as a POWERPC processor manufactured by MOTOROLA. However, other suitable X86 or other microprocessor platforms may be utilized. In some embodiments, CPU 400 is a multi-core processor. In other embodiments, CPU 400 comprises multiple CPUs connected by a communications fabric such as HYPERTRANSPORT INFINIBAND or PCI-EXPRESS.

In an exemplary embodiment, chipset 420 includes a memory interface (e.g., as provided by a north bridge device such as a model 965GM from INTEL) to memory 410 and one or more system bus interfaces for bus 428 and other system and/or peripheral busses such as one or more PCI-EXPRESS busses (e.g., as provided by various south bridge devices such as various NFORCE devices from NVIDIA corporation or similar south bridge devices from INTEL or AMD corporation). In various embodiments, chipset 420 comprises integrated or discrete graphics processing functions, for example as provided by a GMA3100 Integrated Graphics Media accelerator from INTEL corporation or GEFORCE Graphics Processing Unit (GPU) from NVIDIA corporation. Control functions 422, 424 and 426 represent various industry-compliant bus controllers and device interfaces typical of a CPU sub-system such as sub-system 112. In an exemplary embodiment, function 422 comprises a display controller associated with graphics display signal 450, wherein signal 450 is a digital or analog display signal such as a VGA, LVDS, DVI or DISPLAYPORT signal. In an embodiment, function 424 comprises a USB control function such as one or more OHCI, EHCI, UHCI and/or WHCI controllers with associated root hub and PHY components for terminating USB busses 452, wherein busses 452 comprise four USB 2.0 busses as a typical example. In an embodiment, function 426 comprises audio controller and codec functions (such as an INTEL HD AUDIO function coupled to a model number ALC883 audio codec from REALTEK corporation) for terminating audio bundle 454, wherein audio bundle 454 comprise input and output audio signals known to the art.

In an embodiment, memory 410 comprises any one or combination of volatile computer readable media (e.g., RAM such as, DRAM, SRAM, DDR DRAM etc.) and nonvolatile computer readable media (e.g., ROM, hard drive, tape, CDROM, DVDROM, magneto-optical disks, EPROM, EEPROM, Flash EPROM etc.) coupled to chipset 410 by one or more memory busses, for example a north bridge memory interconnect. Moreover, in some embodiments, memory 410 incorporates electronic, magnetic, optical, and/or other types of storage media known to the art. In some embodiments, memory 410 is globally distributed, for example some memory may be connected to interconnect 428. Memory 410 stores machine readable instructions and data structures associated with an offline application runtime environment 412 such as operating system (e.g., a WINDOWS operating system from MICROSOFT, Inc. for example WINDOWS XP or WINDOWS VISTA, a LINUX operating system available from many vendors or a UNIX operating system, also available from many vendors) drivers, application software, graphics data, runtime data structures and the like. In some cases, for example select embodiments in which application runtime environment 412 executes at least in part as a virtualized desktop environment such as a VMWARE ACE, MICROSOFT KIDARO or MOKAFIVE LIVEPC environments, memory 410 comprises a Hypervisor such as ESX SERVER from VMWARE Corporation, XENSERVER from CITRIX Corporation or HYPER-V from MICROSOFT Corporation which coordinates the execution schedule of the virtualized desktop environment and interaction with the user interface devices. In some embodiments, memory 410 further comprises a boot image associated with the runtime environment of CPU sub-system 112. In other embodiments, CPU 400 retrieves a boot image from memory 120 in FIG. 1.

Peripheral interfaces $430_1$-$430_3$ represent various well known peripheral bus interfaces and/or system functions such as one or more PCI or PCI-EXPESS expansion interfaces, Ethernet, ATA, and/or SCSI controller functions and the like that terminate one or more system busses 428. For example, in an embodiment, interface $430_1$ comprises a gigabit Ethernet controller (such as a well-known Ethernet controller from BROADCOM or MARVEL corporation) and supplies a Gigabit Media Independent Interface (GMII) connection 432 to router 118 in FIG. 1. In various alternative embodiments, one or more of the interfaces $430_1$-$430_3$ are integrated with chipset 420. In other embodiments, CPU sub-system 112 comprises more or fewer peripheral interfaces than interfaces $430_1$-$430_3$ depicted.

In other various embodiments, CPU 400 and/or chipset 420 further incorporate hardware-based virtualization management features such as emulated register sets, address translation tables, interrupt tables, PCI I/O virtualization (IOV) and I/O memory management unit (IOMMU) to enable efficient transfer of data between peripheral interfaces and protected regions of memory 410 allocated to a virtual machine associated with user interface 104 (ref. FIG. 1).

FIG. 5 illustrates selected details of an embodiment of a resource selector 116 in FIG. 1 comprising switching elements and connection manager enabled to selectively couple user interface 104 of FIG. 1 to online CPU sub-system 142 using UI link 152 to remote bridge 114 (ref. FIG. 1) or using UI link 154 to CPU sub-system 112 (also in FIG. 1) or concurrently to both CPU sub-systems.

Connection Manager 500 is a dedicated or shared processor such as an embedded microcontroller, a logic sequencer or the like enabled to configure image selector 510, USB selector 520 and audio selector 530 based on at least one of network status, a selector switch position or a peripheral device event such as a keyboard hotkey sequence. In various embodiments connection manager 500 is enabled to detect the presence of central computer 140 (ref. FIG. 1), detect user connection preferences and assert selection signal 506 which configures the user interface connections according to host termination requirements. In some embodiments, at least part of connection manager 500 is implemented as machine readable instructions executed by CPU sub-system 112 in FIG. 1. In an exemplary embodiment, connection manager 500 is coupled to router 118 by network connection 156 and receives user connection preferences on connection 504, wherein connection 504 is for example, coupled to a selector switch associated with user interface 104 or a packet inspection function associated with one or more USB connections enabled to detect hotkey or defined key sequences from a keyboard device.

Image selector 510 is enabled to connect one or more digital and/or analog source display signals to display connection 512 which is coupled to one or more display devices of user interface 104 in FIG. 1 (ref display 130 in FIG. 1). In select embodiments, image selector 510 comprises an LVDS switch such as model number PI2LVD412 four channel LVDS multiplexer from PERICOM corporation that connects either source video signal 302 from display decoder 300 in FIG. 3 or source video signal 450 from a display controller function of CPU sub-system 112 (ref FIG. 4). In other select embodiments, image selector 510 comprises a VGA switch such as model number P15V330A quad 2-channel VGA multiplexer from PERICOM corporation that connects either a source VGA signal from display decoder 300 in FIG. 3 or a source VGA signal from a display controller function of offline CPU sub-system (ref CPU sub-system 112 in FIG. 4). In other embodiments, digital display signals 302 and 450 arrive at image selector 510 as synchronized signals with matching display parameters (e.g., matching display resolution), thereby enabling a smooth tear-free transition between image sources. In an exemplary embodiment, signals 302 and 450 are synchronized by feeding timing information and display attributes such as Display Data Channel (DDC) information from display controller 422 in FIG. 4 to the display controller of display decoder 300 in FIG. 3, enabling decoder 300 to synchronize to the display controller of CPU-sub-system 112. In further embodiments, such as image selector 600 depicted below in FIG. 6, source video signals 302 and 450 are combined to enable concurrent display of online and offline display information.

USB selector 520 is enabled to connect one or more USB busses to USB bus set 522 which itself is coupled to one or more USB devices of user interface 104 in FIG. 1. In select embodiments, USB selector 520 comprises a USB multiplexer such as model number PI3USB40 eight channel 2:1 USB 2.0 multiplexer from PERICOM corporation that connects either bridged USB bus set 312 from USB bridge client module 310 in FIG. 3 or USB bus set 452 from a USB controller function of CPU sub-system 112 in FIG. 4 to user interface 104 using USB bus set 522. In an embodiment, bus set 522 comprises three of four available switched USB busses. A fourth bus is coupled to USB-to-SATA controller 540 (such as model number OXU931S USB-to-SATA controller from OXFORD SEMICONDUCTOR corporation). USB-to-SATA controller 540 provides SATA bus 542 which, in an embodiment, is coupled to memory 120 in FIG. 1 and used by the active CPU sub-system (sub-system 142 or sub-system 112) to store synchronization logs and/or load boot images. In other embodiments such as USB selector 800 depicted in FIG. 8, selective USB signals from each bus set are switched to USB bridge client module 310 while others are connected to CPU sub-system 112 which enables selective devices to connect to online CPU sub-system 142 in FIG. 1 and other devices to connect to offline CPU sub-system 112 in FIG. 1. In other embodiments, one or more USB busses from USB bridge client module 310 in FIG. 3 is connected to a SATA controller and SATA signals associated with CPU sub-system 112 or CPU sub-system 142 are selectively coupled to memory 120 by a SATA switch.

Switched SATA bus 542 may be inappropriate for select embodiments that enable concurrent operation of CPU sub-system 112 and CPU sub-system 142 in a composite display environment (detailed further in association with FIG. 6) because memory 120 may be actively shared during synchronization of CPU sub-system 112 and CPU sub-system 142. A multi-ported interface to memory 120 such as a NAS or SAN interface coupled to router 118 that enables shared data and file system access is a useful alternative in some such embodiments.

Audio selector 530 is enabled to select a termination host for one or more audio devices. In select embodiments, audio selector 530 comprises an analog switch such as model number P13A412E quad Single Pole Double Throw (SPDT) analog switch from PERICOM corporation that connects audio devices (via bundle 532 to/from audio devices of user interface 104 in FIG. 1) to either bridged audio bundle 322 from audio bridge client module 320 in FIG. 3 or to audio bundle 454 from an audio controller function of CPU sub-system 112 in FIG. 4. In other embodiments such as audio selector 700 depicted in FIG. 7, selective audio signals from bundles 322 and 454 are mixed to enable concurrent audio stream associated with online CPU sub-system 142 and CPU sub-system 112.

In various alternative embodiments, resource selector 116 comprises one or more additional peripheral connection selectors such as selection functions that select FIREWIRE, BLUETOOTH, or PS/2 signals between user interface 104 in FIG. 1 and either CPU sub-system 112 or CPU sub-system 142 in FIG. 1.

Figure 6:
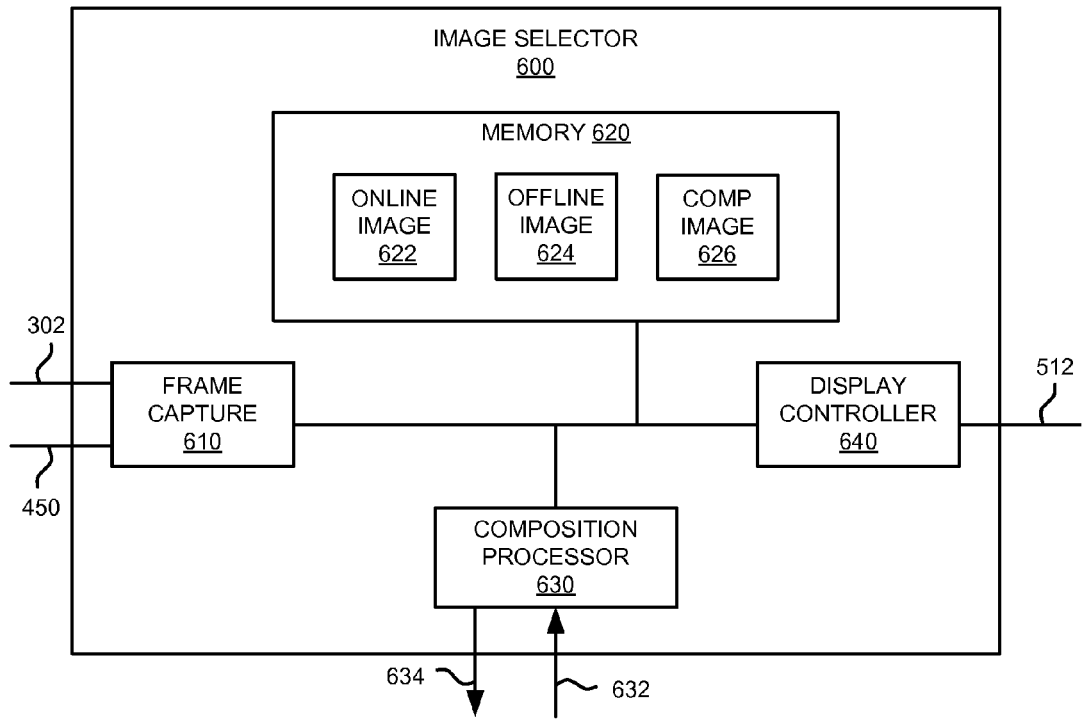
FIG. 6 illustrates selected details of an image selector enabled to generate a composite display image from concurrent offline and online image sources.

FIG. 6 illustrates selected details of image selector 600 which is an alternative embodiment of image selector 510 in FIG. 5. Image selector 600 is enabled to generate one or more composite display images from concurrent offline and online image sources. Image selector 600 comprises frame capture module 610 coupled to bridged video signal 302 from decoder 300 (ref. FIG. 3) and local video signal 450 from CPU sub-system 112 (ref. FIG. 1). Capture module 610 stores display data from central computer 140 (FIG. 1) in memory 620 as online image 622 while display data from the CPU sub-system 112 is stored as offline image 624, wherein in various embodiments, images 622 and 624 comprise partial image frames, complete image frames or multi-frame image sequences.

Composition processor 630 is an image processor enabled to scale at least one of online image 622 or offline image 624, for example according to a user-defined window dimension, and generate composite image 626 based on a combination of the scaled image and the non-scaled image, for example as foreground and background images or split-screen images. In an exemplary embodiment, composite image 626 includes a background image comprising offline image 624 (associated with the application environment of CPU sub-system 112 in FIG. 1) with an overlay window comprising a scaled online image 622, windowed by a frame structure and scaling toolbar generated by processor 630. In other embodiments, both offline and online images are scaled. In some embodiments, alpha blending is applied to one or both windows dependent on overlay composition. In other embodiments, a suitably colored blank screen or status message is presented in the place of online image 622 in the absence of an active bridged video signal 302 to central computer 140 (in FIG. 1). In other embodiments, the background display image is blank if CPU sub-system 112 is suspended or placed in a power reduced state. In various embodiments, composition processor 630 is enabled to receive composition event signal 632 comprising cursor location and select keyboard/mouse events directed from driver software executing on CPU sub-system 112, for example signals from composition control software 960 depicted later in FIG. 9. Selective keyboard events and/or cursor location set the current display focus or other attributes of the display composition (e.g., In various embodiments, overlay window position and scaling can be set by dragging the frame in a similar manner to manipulation of a MICROSOFT WINDOWS environment). In some embodiments, various assigned keyboard events are used to control image composition and current focus, such as flipping between full-screen online and offline display images and setting alpha blending parameters, etc. In various embodiments, current display focus signal 634 is utilized to present the current display focus (e.g., as determined by the present cursor location and/or defined events) back to USB termination control functions such as USB routing software of CPU sub-system 112 or USB bus switching functions of resource selector 116.

Display controller 640 accesses composite image 626 and generates display video signal 512 to one or more displays associated with user interface 104 in FIG. 1, for example in the form of one or more DISPLAYPORT, DVI, LVDS, or VGA interfaces.

According to various embodiments, part or all of image selector 600 includes one or more of: a programmable embedded digital media processor, such as a TMS320DM64x DaVinci™ digital media processor available from TEXAS INSTRUMENTS; a PNX1300 NEXPERIA processor from NXP Semiconductors; a Field Programmable Gate Array (FPGA) or an Application Specific Integrated Circuit (ASIC) configured, at least in part, as a logic circuit to perform image scaling and composition; other processors and/or electronic hardware suitable for performing image scaling and composition; and any combination of the foregoing.

Figure 7:
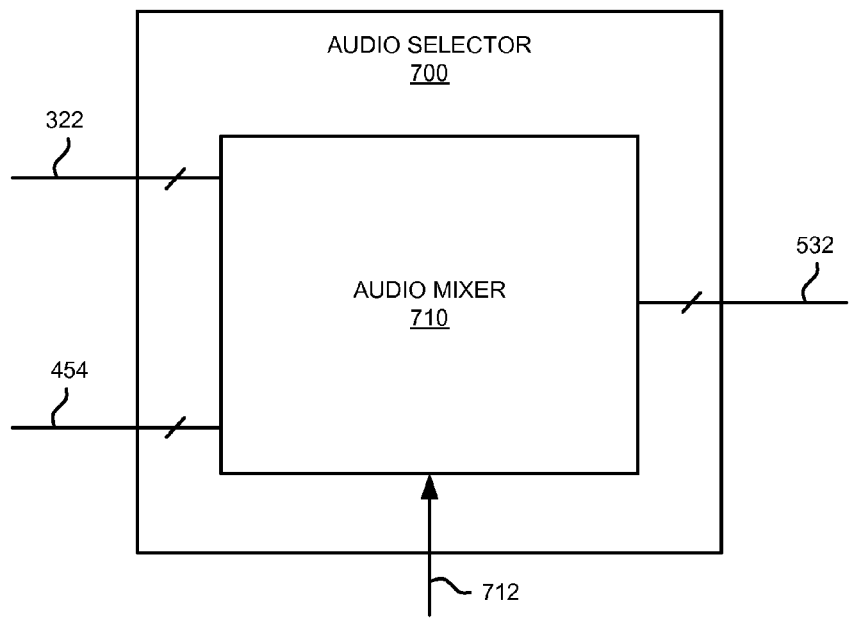
FIG. 7 illustrates selected details of an audio selector enabled to mix audio signals associated with offline and online CPU resources.

FIG. 7 illustrates selected details of audio selector 700 which is an alternative embodiment of audio selector 530 in FIG. 5. Audio selector 700 is enabled to mix audio signals associated with offline and online CPU resources.

Figure 9:
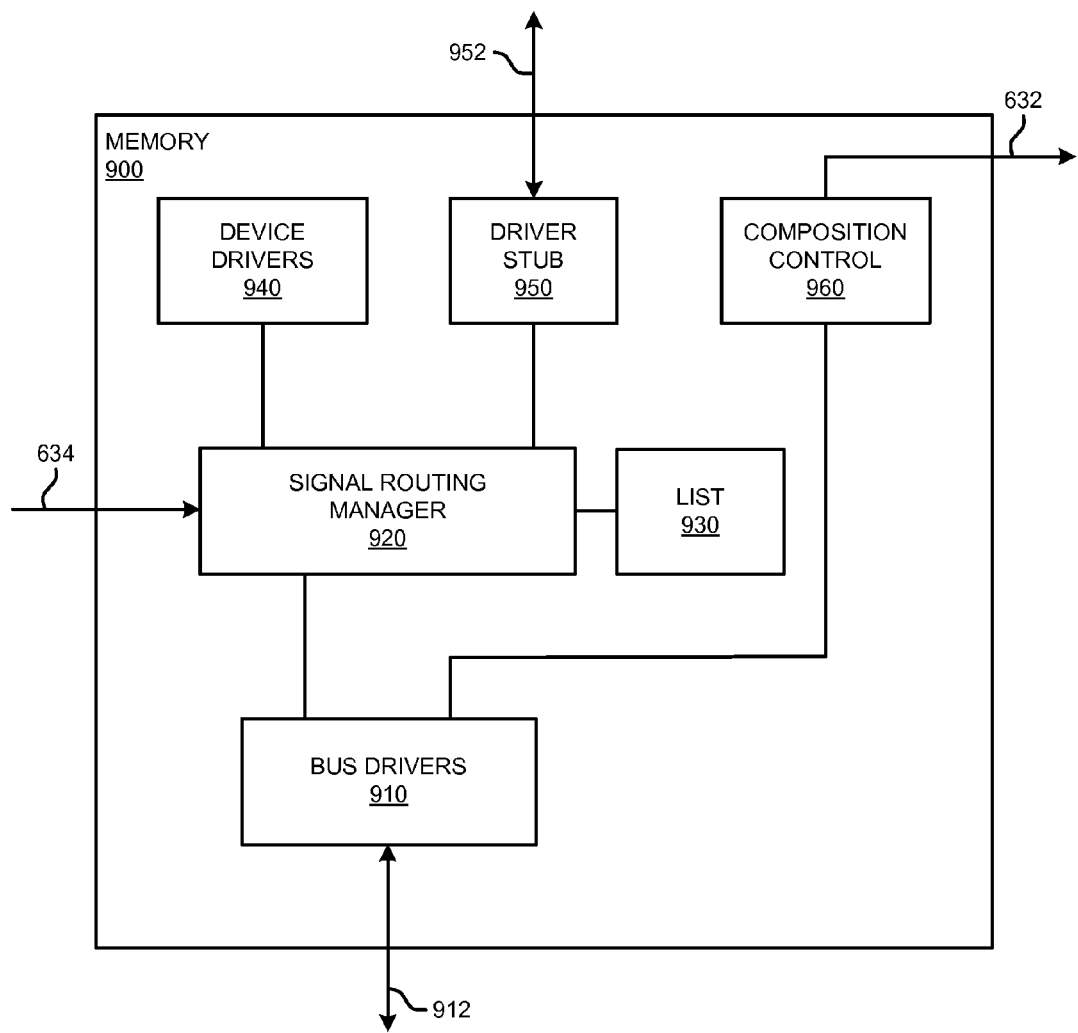
FIG. 9 illustrates selected details of machine-executable software enabled to route USB device data to offline or online CPU resources.

In an embodiment, audio selector 700 comprises audio mixer 710. An embodiment of an audio mixer includes one or more of: a programmable embedded digital audio processor, such as a digital signal processors available from TEXAS INSTRUMENTS or ANALOG DEVICES; a Field Programmable Gate Array (FPGA) or an Application Specific Integrated Circuit (ASIC) such as those manufactured by NATIONAL SEMICONDUCTOR configured, at least in part, as a logic circuit to perform mixing of input audio signals (such as line-in and microphone) and/or output audio signals (such as line-out and speaker); other processors and/or electronic hardware suitable for performing audio mixing; and any combination of the foregoing. In an embodiment, input audio signals are broadcast to both CPU sub-systems 112 and CPU sub-system 142 (in FIG. 1) while output audio signals associated with the CPU sub-system currently not in focus are muted. In another embodiment, input audio signals are directed to CPU sub-systems 112 or CPU sub-system 142 in accordance with the current display focus. In various embodiments, audio mixer 710 is enabled to receive audio control commands 712 such as mouse and keyboard events directed from HID driver software executing on CPU sub-system 112. Selective commands are used to set audio mixing requirements such as audio selection and mixing parameters. In some embodiments, cursor location or various assigned keyboard events are used to control audio mixing, such as switching audio host or adjusting mixing parameters. An embodiment of a software structure supportive of audio control commands 712 is depicted in FIG. 9.

Figure 8:
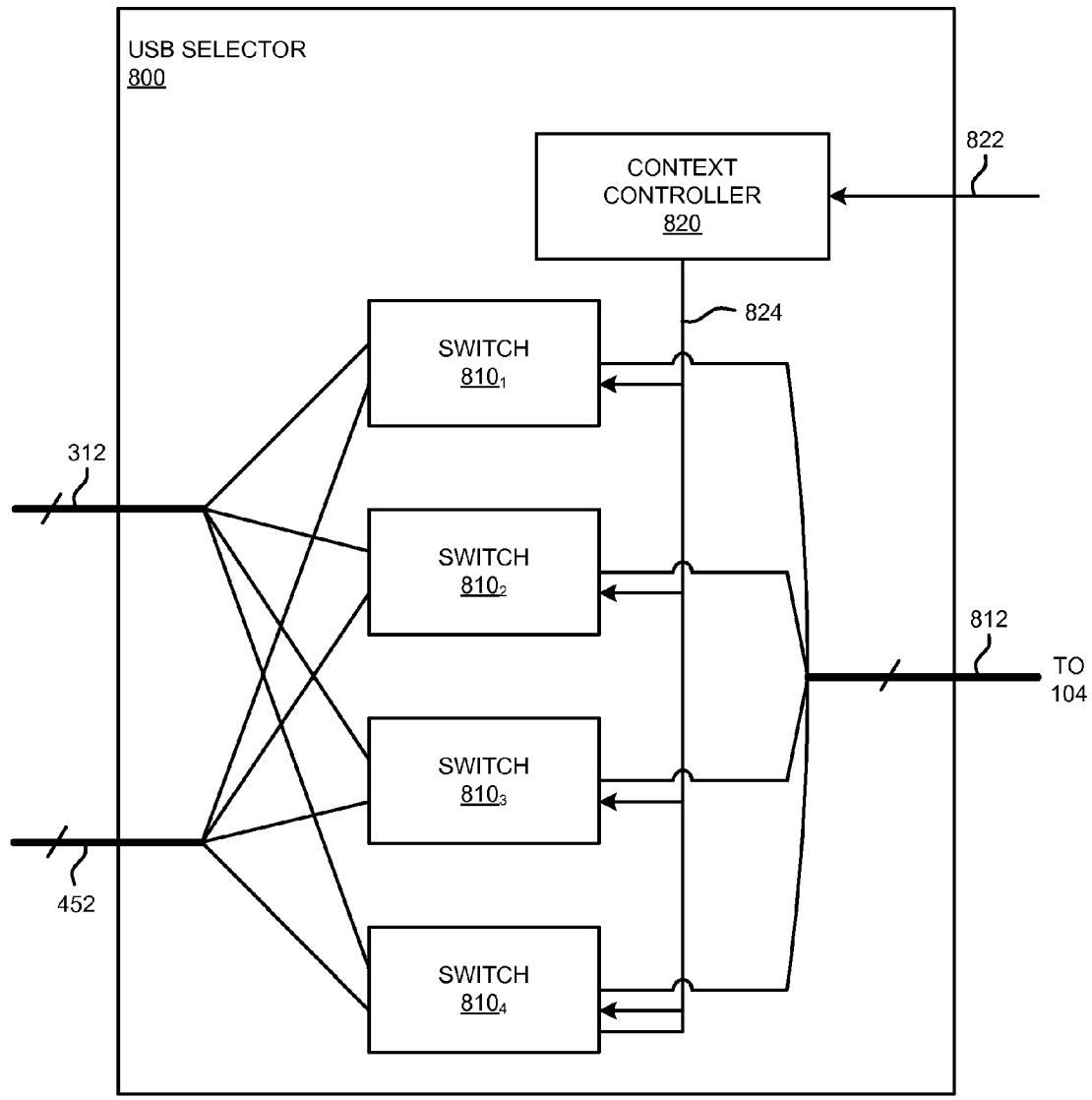
FIG. 8 illustrates selected details of a USB selector enabled to direct USB signals between USB peripheral devices and offline or online CPU resources.

FIG. 8 illustrates selected details of USB selector 800 which is an alternative embodiment of USB selector 520 in FIG. 5. USB selector 800 is enabled to connect USB peripheral devices to either CPU sub-system 112 or CPU sub-system 142 in FIG. 1 on an individual basis, dependent on the device context.

USB selector 800 comprises USB bus switches $810_1$-$810_4$ under management of context controller 820. Each switch 810 is independently enabled to connect a device attached to user interface 104 in FIG. 1 (via UI USB bus set 812) to either online CPU-sub-system 142 in FIG. 1 using a bridged USB bus (ref. bus set 312) or to CPU sub-system 112 using a local USB bus (ref. bus set 452).

According to various embodiments context controller 820 includes one or more of: a programmable processor; a Field Programmable Gate Array (FPGA) or an Application Specific Integrated Circuit (ASIC) configured, at least in part, as a logic circuit to perform switching of one or more USB busses based on device context information such as current display focus or defined device configuration parameters.

In some embodiments, USB switches $810_1$-$810_4$ connect all USB devices attached to bus set 812 to CPU sub-system 112 (via bus set 452) as a default configuration, thereby enabling offline enumeration of all USB devices. In some such embodiments, software executed by CPU sub-system 112 determines whether any devices should be re-connected to central computer 140 (FIG. 1) and configures the associated switch 810 accordingly, for example by programming context controller 820 with appropriate context information 822. Context controller 820 is enabled to configure each switch 810 independently via selection signal 824. Some embodiments utilizing switch 810 to redirect USB devices to the central computer, further enable USB client module 310 in FIG. 3 to notify context controller 820 of device disconnection events, thereby allowing the switch to be reset such that future attached devices are terminated at CPU sub-system 112 for local enumeration.

In other embodiments, context controller 820 receives an indication of the current display focus (i.e., whether a foreground display window associated with the central computer or a background display session associated with the remote computer is selected or otherwise the focus of user input) and sets the switch 810 accordingly. In some such embodiments, controller 820 stores device association information so that previously determined device assignments can be re-established following power interruptions etc.

In other embodiments, USB devices are terminated by bus driver software of CPU sub-system 112 and select device data re-routed by CPU-sub-system to the central computer (for example using USB/IP protocols known to the art) based on information such as device configuration parameters. Details of a software embodiment for accomplishing such device redirection are described in association with FIG. 9.

In other embodiments, one or more switches 810 comprise USB packet inspection logic for determining USB device information such as device ID communicated during device enumeration.

Attached devices are initially enumerated locally by CPU sub-system 112 (FIG. 1) and selective devices are switched to the central computer for re-enumeration and subsequent use after the device type is determined. In some cases, such as select HID devices, USB data packets on the USB bus are actively directed by switch 810 to either CPU sub-system 112 or central computer 140 dependent on the current display focus.

Other embodiments, such as some embodiments disclosed in Teradici U.S. patent application Ser. No. 11/694,756 entitled "Selective Routing of Peripheral Device Signals" and incorporated by reference herein, comprise a USB bus controller operating in tandem with a bridged USB bus controller. In select embodiments, such a tandem structure is a suitable replacement function for USB function 424 of FIG. 4.

In other embodiments, the switching function offered by switch 810 is incorporated with descriptor processing operations of the USB bus controller. In an exemplary embodiment, USB bridge client module 310 in FIG. 3 builds an aggregated descriptor list comprising descriptors received from CPU sub-system 142 in FIG. 1 (via USB bridge host module 210 in FIG. 2) and descriptors generated by a Host Controller Driver (HCD) of CPU sub-system 112, (i.e., rather than executing descriptors, USB function 424 (FIG. 4) communicates descriptors to client module 310 for aggregation). Client module 310 maintains separate descriptor 'done queues" associated with each CPU sub-system and returns processed descriptors to the designated host based on the device context as indicated by context controller 820.

FIG. 9 illustrates selected details of memory 900, an alternative embodiment to memory 410 in FIG. 4, comprising machine-executable software enabled to route USB device signals to the software application environment of CPU sub-system 112 or CPU sub-system 142 (both in FIG. 1). Memory 900 comprises software enabled to manage USB bus controller 424 (ref. FIG. 4) and selectively route device signals according to device connection parameters including at least one of current display focus, device information or user-defined termination preferences. Details relating to methods for selectively routing user interface signals to a remote computer or a host computer are disclosed in Teradici U.S. patent application Ser. No. 11/694,756 entitled "Selective Routing of Peripheral Device Signals" filed on Mar. 30, 2007 (incorporated by reference herein in its entirety) and an overview is presented here for convenience.

Bus drivers 910 manage USB bus controller 424 of FIG. 4 using logical connection 912 such as an industry-compliant Host Controller Interface (HCI). Drivers 910 comprise low and high level bus drivers known in the art. The low level driver provides one or more bus controller interfaces to underlying bus controller circuitry, for example interfaces compliant with Open Host Controller Interface (OHCI), Enhanced Host Controller Interface (EHCI), Universal Host Controller Interface (UNCI), Wireless Host Controller (WHCI) or USB 3.0 compliant Extensible Host Controller Interface (xHCI) specifications. High level bus drivers typically comprise a Host Controller Driver (HCD), core driver and hub driver associated with the root hub of the underlying bus controller circuitry, responsible for enumerating the root hub, converting high level I/O requests (e.g., USB Request Blocks (URBs)) received from local or central device drivers into low-level transfer descriptors, and scheduling the descriptors for execution. The USB core driver defines resource management policy, performs bandwidth accounting, configures peripheral devices, provides hot plugging functions and directs URB related function calls to the appropriate function implemented by the HCD. In some embodiments, some or all of the core driver functions are executed by other drivers such as a higher layer functions in an HCD. The hub driver uses the services of the core driver to aid hub-related event management such as detection of the attachment and disconnection of devices to a specific hub.

Signal routing manager 920 controls switching of data connections from USB devices to either device drivers local to CPU sub-system 112 (such as device drivers 940) or device drivers local to CPU sub-system 142 in FIG. 1 based on the current display focus signal 634 provided by composition processor 630 of FIG. 6 and/or routing preferences stored in list 930. In various embodiments, list 930 comprises device configuration parameters such as user- or administrator-specified termination requirements or connection path preferences, device driver location information, device authorization information, user assignments or other information useful in determining whether a USB device should be terminated by CPU sub-system 112, CPU sub-system 142 or prevented from further access.

In various embodiments, device drivers 940 (alternatively referred to as 'class drivers' in some MICROSOFT WINDOWS embodiments) comprise an HID driver to support termination of mouse and keyboard and other drivers such as mass storage, audio, video, printer, serial drivers or the like depending on the diversity of peripheral devices supported by CPU sub-system 112.

Device driver stub 950 provides a protocol for communicating device information between bus drivers 910 and device drivers on the central computer, for example by communicating URBs using a USB/IP protocol known to the art. Driver stub 950 receives URBs from central computer 140 in FIG. 1 and transmits URB responses, device state information and requested data such as USB data back to central computer over link 952. Device driver stub 950 is typically responsible for URB sequence and return code tracking within memory 900. In select embodiments, device driver stub 950 translates URB formats between the format native to the operating system of memory 900 and the central computer host system such as translation between MICROSOFT WINDOWS and LINUX formats.

Composition control software 960 is enabled to present selective HID information as composition event signal 632 to composition processor 630 in FIG. 6. Software 960 traps defined keyboard events which are forwarded to composition processor 630 (e.g., hotkey events associated with a desired change in current display focus or desired re-scaling of a display overlay) and mouse events used for dragging and scaling of windows. Such event information may be captured between bus drivers 910 and routing manager 920 or derived from a generic HID stack associated with software 960. Cursor location information used to set the current display focus or drag an overlay window is derived from mouse movement information or obtained as cursor co-ordinates from the generic HID stack. Note that cursor location and HID event information is required irrespective of device signal routing so the generic HID stack should not be located above signal routing manager 920 in embodiments where HID information is presented to composition processor 630. Rather, in select embodiments routing manager 920 regulates HID information such that HID events are communicated to the local application environment when CPU sub-system 112 (FIG. 1) is the focus of the user. When central computer 140 (FIG. 1) is the focus of the user, HID signals encapsulated as URBs from bus driver 910 are communicated to the central computer via driver stub 960.

In select embodiments, routing manager 920 uses bus drivers 910 to query a device for identification data (e.g., Device ID, Vendor ID and/or Device Class information) after a connection event. If a device is authorized for connection, a connection is made between the device and either the appropriate device driver 930 or a device driver at the central computer (via driver stub 940), dependent on the current display focus or a device configuration parameter in list 930. In other select embodiments, driver stack 910 or routing manager 920 monitors for disconnection events and signals routing manager 920 of the status change so that connection list 930 can be updated to a default state. In other select embodiments, memory 900 comprises client terminal services such as Remote Desktop Protocol (RDP) connection services, Citrix Metaframe or similar T.120-related protocols or extensions for exchanging abstracted I/O information such as pointer location information and/or keyboard data between device drivers 940 and software at the central computer. In other embodiments, routing manager 920 selects a bridged USB connection to the central computer (via USB client module 310 in FIG. 3 and USB host module 210 in FIG. 2) for select devices which is accomplished by setting USB bus switch 810 (FIG. 8) as previously described in association with FIG. 8. In some such embodiments, USB client module 310 detects disconnection events and redirect the USB bus (by resetting bus switch 810) for termination by CPU sub-system 112 in preparation for a future connection.

In some embodiments memory 900 comprises USB configuration software for entering device configuration parameters in list 930 (e.g., a configuration pop-up window) or retrieving configuration information from a management server on network 102 (FIG. 1). In various embodiments, memory 900 further comprises additional components such as operating system, drivers, application software, connection management services, plug and play services, network services, encryption service or other services omitted from FIG. 9 so as not to obscure aspects of the present invention.

Figure 10:
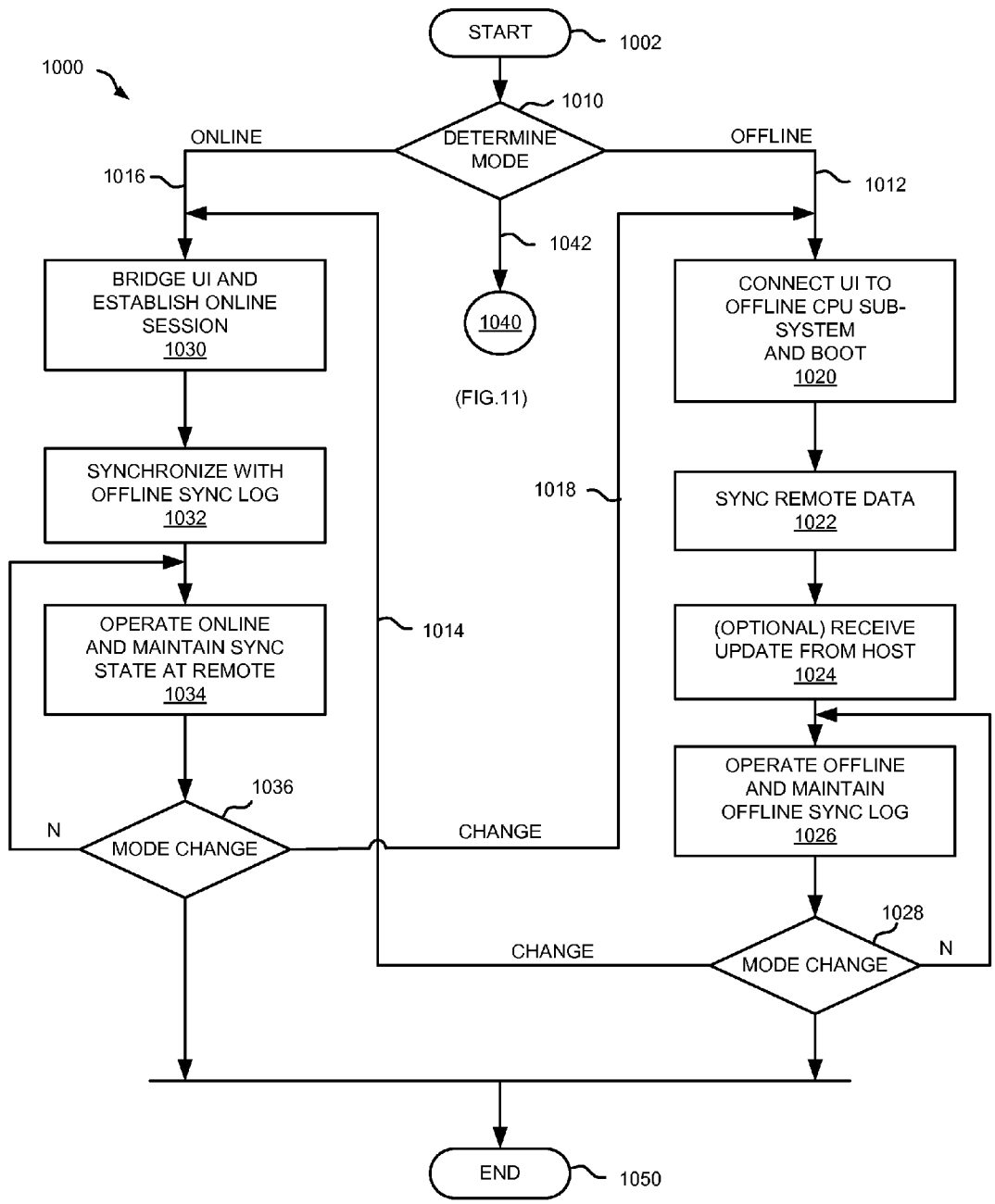
FIG. 10 illustrates an embodiment of a process for operating a remote computer in an online mode, an offline mode or a mixed operational mode.

FIG. 10 illustrates an embodiment of a process for operating a remote computer in one of an online mode, an offline mode or a mixed operational mode, including switching between modes according to connection preferences. Process 1000 starts ("Start" 1002) and proceeds to step 1010 ("Determine Mode"). According to some embodiments step 1010 comprises evaluating the setting of a selector switch, for example a mode switch on the keyboard of the remote computer (ref. computer 110 in FIG. 1). In other embodiments, step 1010 comprises automatically establishing an online connection if a network connection and central computer are available. In other embodiments, the remote computer defaults to an offline connection utilizing its local CPU sub-system and an online connection is only established following a keyboard hotkey sequence. In other embodiments, the default mode and/or other authorized modes are determined by a management server on the network or an authorization key such as a USB dongle connected to a port of the remote computer.

In case 1012, it is established that the remote computer shall operate in an offline mode and process 1000 proceeds to step 1020 ("Connect user interface (UI) to offline CPU sub-system and boot"). Referring to system 100 of FIG. 1, resource selector 116 connects user interface 104 to CPU sub-system 112 and CPU sub-system 112 boots from an offline boot image such as an image stored in memory 410 in FIG. 4 or memory 120 in FIG. 1 via USB-to-SATA convertor 540 in FIG. 5. In select embodiments, CPU-subsystem 112 loads a base operating system from memory 410 and a portable desktop environment such as POCKET ACE from VMWARE corporation, ENTERPRISE DESKTOP (KIDARO) from MICROSOFT CORPORATION or a similar virtualized application environment from memory 120 or a USB Mass Storage Device (MSD).

Process 1000 proceeds to step 1022 ("Sync Remote Data"). According to select embodiments, step 1022 comprises synchronization the state of the offline application environment with the most recently stored state information associated with the online application environment. In an exemplary embodiment, the state of the online application environment is actively maintained during online computing sessions as online sync state 124 in memory 120. In such a case, step 1022 comprises accessing file and configuration update information from sync state 124 and updating corresponding files and configurations in the offline application environment (ref. offline application runtime 412 in FIG. 4).

In some embodiments, process 1000 proceeds to step 1024 ("Receive Updates from Host"). In other embodiments, such as embodiments where connections to central computer 140 (FIG. 1) or a management server are unavailable, process 1000 proceeds to step 1026. Step 1024 comprises receiving refreshed authorization and/or environment updates (such as software upgrades, security patches and the like) from a management server and/or central computer 140.

Process 1000 proceeds to step 1026 ("Operate Offline and Maintain Offline Sync Log"). In various embodiments, step 1026 comprises executing an offline application runtime environment (ref. offline application runtime 412 in FIG. 4) with CPU sub-system 112 (FIG. 1) coupled to user interface 104 and tracking modifications made to files and configurations that are common to both the offline and online computing environments, such as modifications to file structures, documents, spreadsheets, desktop configuration and the like. Such modifications are tracked in offline sync log 122 which is made available to the central computer during online operation.

Process 1000 continues to operate offline (step 1026) until a mode change is detected as step 1028 ("Mode Change"). In case 1014, remote computer 110 (FIG. 1) initiates online operation by proceeding to step 1030, for example as determined by a selector switch, hotkey or availability of a network connection. Process 1000 terminates as step 1050 ("End"), for example when the remote computer is powered down.

In cases 1014 or 1016 where it is determined that the remote computer shall operate in an online mode, process 1000 proceeds to step 1030 ("Bridge UI and establish online session"). Referring to system 100 of FIG. 1, resource selector 116 connects user interface 104 to client bridge 114. Client bridge 114 established a session with host bridge 144, the session typically comprising a session management connection, one or more display connections, a USB connection associated with each USB device of user interface 104 and an audio connection associated with each audio device of user interface 104. In select embodiments, online CPU sub-system 142 (FIG. 1) mounts memory 120 (FIG. 1) and boots from a disk image comprising a base operating system and virtualization software maintained at central computer 140 and then loads a portable desktop environment such as POCKET ACE from VMWARE corporation, ENTERPRISE DESKTOP (KIDARO) from MICROSOFT CORPORATION or a similar virtualized application environment from memory 120 or a USB MSD. In some embodiments, the same portable desktop environment is utilized by CPU sub-system 112 in offline mode and by CPU sub-system 142 in online mode. In other embodiments, an operating system environment local to CPU sub-system 142 that is unrelated to the operating system of CPU sub-system 112 is bridged to the user interface of the remote computer.

Process 1000 proceeds to step 1032 ("Synchronize with Offline Sync Log"). According to select embodiments, step 1032 comprises synchronizing data maintained at the central computer (ref. CPU sub-system 142 of computer 140) with modifications made to corresponding data in previous offline operation and stored in offline sync log 122 (ref. step 1026). In some embodiments, CPU-sub-system accesses offline sync log 122 via a bridged USB connection to USB memory or using a USB-to-SATA convertor 540 of FIG. 5. In various other embodiments, a SATA interface of CPU sub-system 142 is bridged or memory 120 comprises a NAS or SAN interface (e.g., accessible by network 102 and router 118). The processes involved in creating and maintaining synchronization and utilizing the synchronization logs 122 and 124 forms a data synchronizer 125.

Process 1000 proceeds to step 1034 ("Operate Online and Maintain Sync State at Remote"). In various embodiments, step 1034 comprises executing an online application environment utilizing CPU sub-system 142 (FIG. 1) bridged to user interface 104 and tracking modifications made to files and configurations that are common to both the offline and online computing environments, such as modifications to file structures, documents, spreadsheets, desktop configuration and the like. Such modifications are maintained in online sync state 124 by actively maintaining duplicate copies of data or a change tracking log, either of which is made available to the CPU sub-system 112 for offline synchronization during offline operation (ref. step 1022). In some embodiments, duplicate copies of data files are maintained local to CPU sub-system 142 and in memory 120. When operating in online mode, both copies are maintained and updated in real-time such that data modifications are persistent at remote computer 110, even in the case of a sudden network connection loss.

Process 1000 continues to operate in online mode (step 1034) until a mode change is detected as step 1036 ("Mode Change"). In case 1018, the remote computer initiates offline operation by proceeding to step 1020, for example as determined by a selector switch, hotkey or loss of a network connection. Process 1000 terminates as step 1050 ("End"), for example when user interface 104 is powered down.

Figure 11:
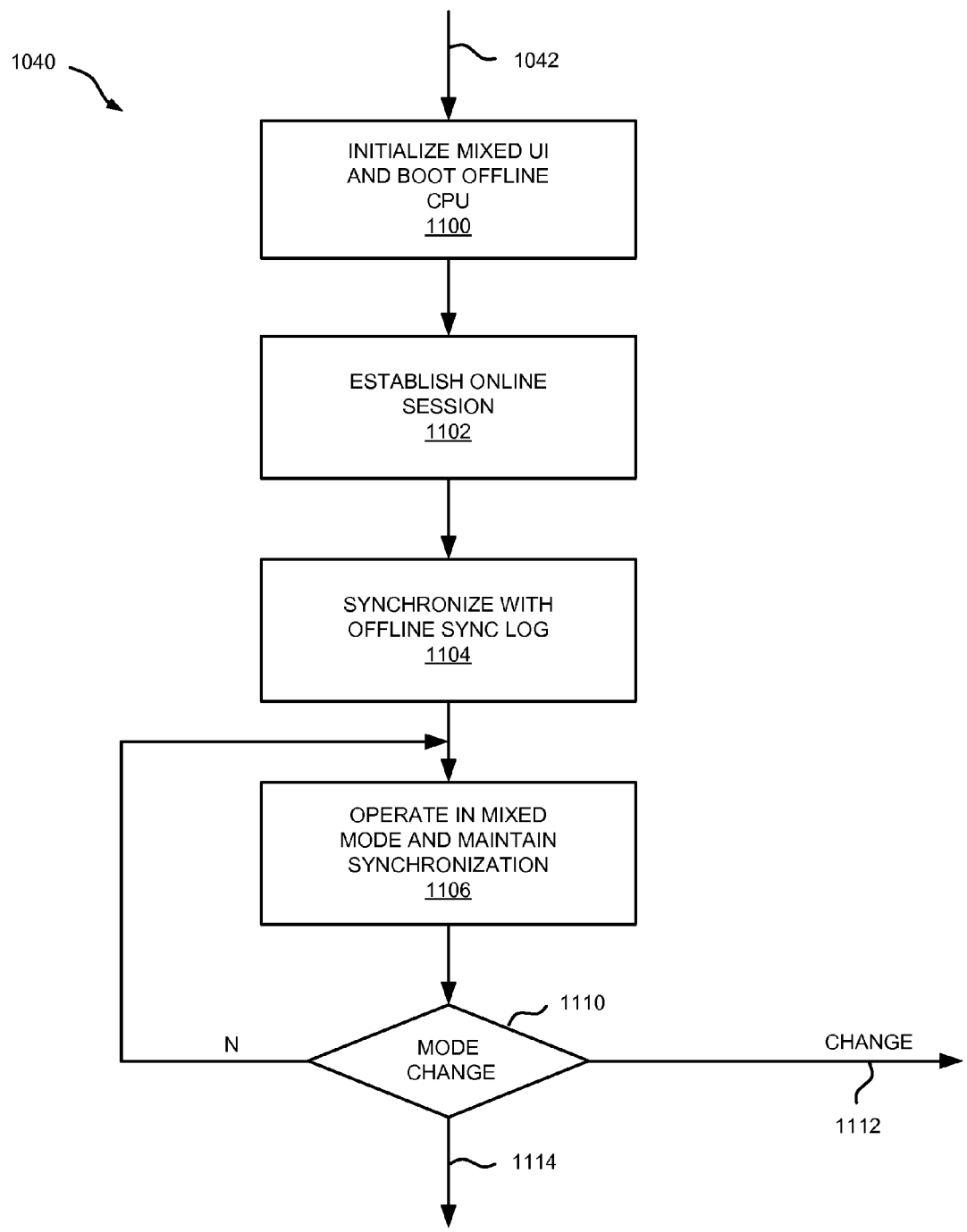
FIG. 11 illustrates an embodiment of a process for operating a remote computer in a mixed operational mode comprising a user interface shared between online and offline computing resources.

In select embodiments, process 1000 enters mixed mode process 1040 following step 1010, an embodiment of which is depicted in FIG. 11 and disclosed below. As with cases 1012 and 1014, case 1042 is responsive to a selector switch setting, keyboard event, network availability or the like.

FIG. 11 illustrates various steps of an embodiment of process 1040 in FIG. 10 wherein a user interface is concurrently associated with both offline and online CPU resources. Process 1040 starts at step 1100 ("Initialize Mixed UI and Boot Offline CPU"). In various embodiments, step 1100 comprises configuring resource selector 116 such that devices associated with user interface 104 are selectively available to the remote computer and/or the central computer. A composition processor (such as processor 630 depicted in FIG. 6) is initialized to generate a composite display image, for example comprising a background image from CPU sub-system 112 with a scaled overlay window with the bridged display image generated by CPU sub-system 142 (FIG. 1). Various USB configurations previously disclosed in association with FIG. 8 are contemplated, including terminating all devices at CPU sub-system 112 or selectively switching USB hosts. In an embodiment comprising shared audio peripherals, an audio mixer such as mixer 710 of FIG. 7 is initialized.

In an embodiment, CPU sub-system 112 boots from an offline boot image such as an image stored in memory 410 in FIG. 4 or memory 120 in FIG. 1 via USB or USB-to-SATA convertor 540 in FIG. 5 or NAS (or SAN) interface, for example if active synchronization is enabled. In an exemplary embodiment, the runtime application environment of CPU sub-system 112 comprises non-privileged software or data such as office productivity software. CPU sub-system 142 (FIG. 1) boots from a disk image local to central computer 140. In an exemplary embodiment, the runtime application environment of CPU sub-system 142 comprises one or more privileged software applications and data such as Computer Aided Design (CAD) packages, financial services software, medical records or the like not installed on remote computer 110 (FIG. 1).

Process 1040 proceeds to step 1102 ("Establish Online Session"). Client bridge 114 established a session with host bridge 144 (ref. FIG. 1), the session typically comprising a session management connection, one or more display connections, audio connections associated with audio devices and a USB connection associated with any bridged USB devices (or software-based USB connections in some cases where devices are terminated by CPU sub-system 112 and a USB/IP protocol is deployed to convey USB URB data between CPU sub-system 112 and CPU sub-system 142).

Process 1040 proceeds to step 1104 ("Synchronize with Offline Sync Log"). According to select embodiments, step 1104 comprises synchronizing data maintained at the central computer (ref. CPU sub-system 142) with modifications made to corresponding data in previous offline operation and stored in offline sync log 122 (ref. step 1026). In some embodiments, CPU sub-system 142 accesses offline sync log 122 via a bridged USB connection or USB-to-SATA convertor 540 of FIG. 5. In various other embodiments, a SATA interface of CPU sub-system 142 is bridged. In some cases where active synchronization is enabled, memory 120 comprises a NAS OR SAN interface accessible by CPU sub-system 142.

Process 1040 proceeds to step 1106 ("Operate in Mixed Mode and Maintain Synchronization"). In various embodiments, step 1106 comprises concurrent execution of an online application environment which is displayed in a window of display 130 (FIG. 1) and an offline application environment which is displayed in a second window or background image of display 130. In an embodiment, HID device signals associated with USB HID devices such as mouse and keyboard are directed to either CPU sub-system 142 or CPU sub-system 112, dependent on the current display focus, for example as determined by cursor location or a keyboard event. Various other peripheral devices associated with user interface 104 are terminated by CPU sub-system 142 or CPU sub-system 112 dependent on the display focus at the time of device installation or stored configuration parameters. CPU sub-system 112 maintains an offline sync log as described for step 1026 in FIG. 10 and CPU sub-system 142 maintains an online sync state as described for step 1034 in FIG. 10. In some embodiments, semaphore methods known to the art are implemented to maintain synchronized data access by both CPU sub-systems. In some embodiments, resource selector 116 in FIG. 1 facilitates data manipulation such as 'cut and paste' or 'copy and paste' between CPU sub-system 142 and CPU sub-system 112. In an exemplary case, selector 116 identifies well known keyboard sequences such as <CNTRL>+<C> (representing 'copy'), <CNTRL>+<X> (representing 'cut') and <CNTRL>+<V> (representing 'paste') and communicates data transfer requirements with data transfer software (such as clipboard software) associated with each application environment, enabling direct transfer of data between CPU sub-system 142 and CPU sub-system 112. In some such cases, resource selector 116 applies selective filtering of such data transfer requests based on authorization policies.

Process 1040 continues to operate in mixed mode (step 1106) until a mode change is detected as step 1110 ("Mode Change"). In case 1112, a change in mode is determined, for example by returning to step 1010 in FIG. 10. In case 1114, process 1040 terminates by proceeding to step 1050 ("End") in FIG. 10.

Figure 12:
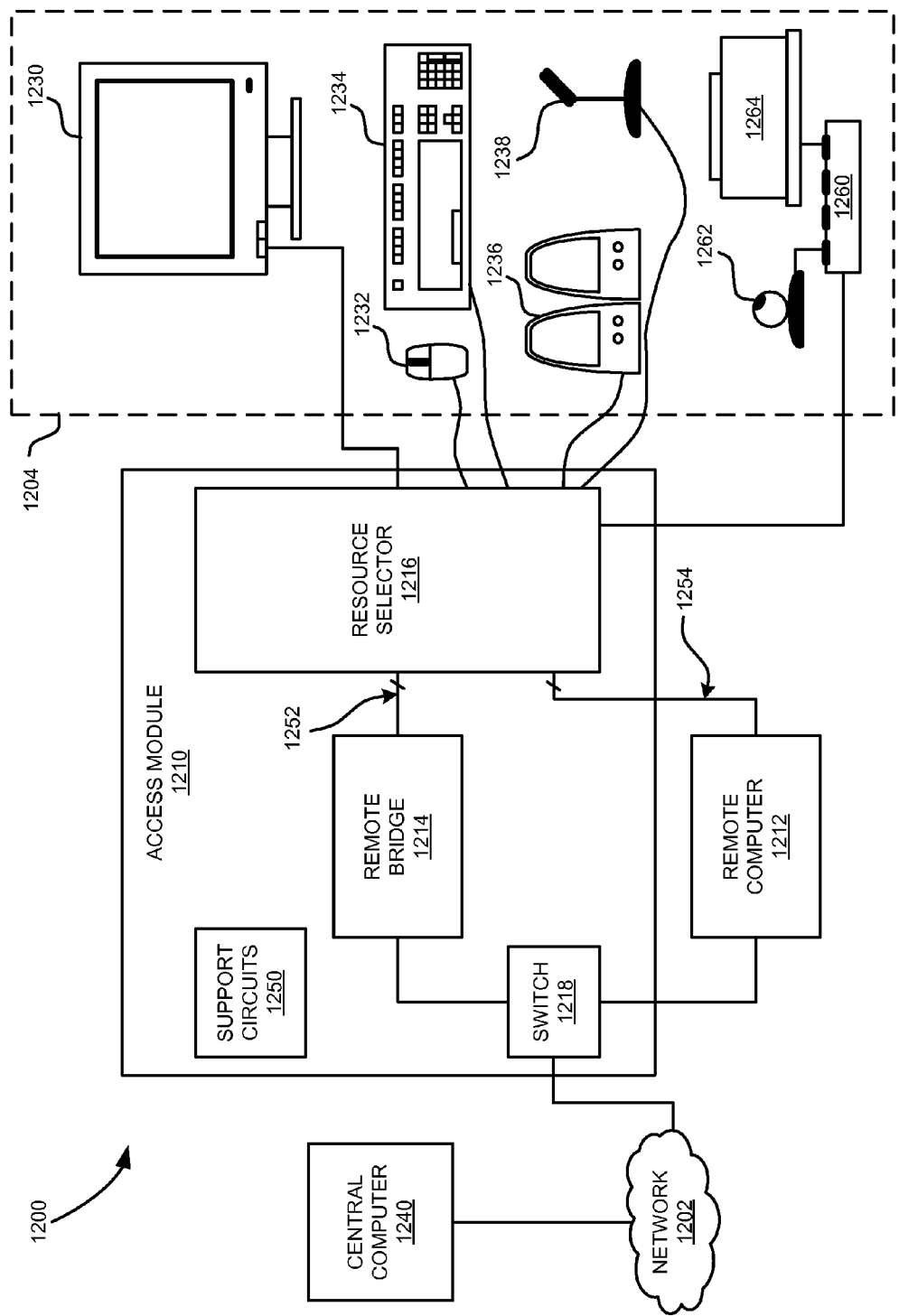
FIG. 12 illustrates selected details of an embodiment of a system comprising a user interface selectively coupled to a remote computer or a central computer by an access module.

FIG. 12 illustrates selected details of an embodiment of a system 1200 comprising a user interface 1204 selectively coupled to a remote computer 1212 or a central computer 1240 by access module 1210.

User interface 1204 is employed to provide interactivity for a user utilizing remote computer 1210 or central computer 1240. In various embodiments, user interface 1204 comprises display 1230, various HID devices including mouse 1232 and keyboard 1234, in addition to various computer peripheral devices including analog speakers 1236 and microphone 1238 and USB devices such as webcam 1262 and printer 1264 connected to hub 1260 (or alternatively to a port of resource selector 1216 in select embodiments).

While display 1230 is typically coupled to access module 1210 using a wired connection such as DVI, DISPLAYPORT, VGA or the like, HID and other peripheral devices are coupled to module 1210 using wired or wireless communication methods such as analog audio, PS/2, USB, wireless USB, BLUETOOTH, FIREWIRE or the like. User interface 1204 of FIG. 12 serves to depict just one combination of user interface devices supported by the present invention and places no limitations on other contemplated configurations. For example, in various alternative embodiments, user interface 1204 comprises a minimal set of devices such as display and single HID device. In other alternative embodiments, user interface 1204 comprises a different combination of devices such as multiple displays employed in combination with a mouse and a keyboard. In other alternative embodiments, user interface 1204 comprises one or more other peripheral device types such as scanners, biometric devices, Mass Storage Devices (MSD), touch sensitive HID devices, motion sensitive HID devices or the like coupled to access module 1210 by suitable peripheral device interfaces.

Access module 1210 comprises resource selector 1216 and remote bridge 1214 which respectively provide user interface switching and bridging functions to enable 'offline' interactivity between UI 1204 and remote computer 1212 or 'online' interactivity with computer 1240.

Resource selector 1216 selectively couples user interface 1204 to remote bridge 1214 via UI link 1252 or to remote computer 1212 using UI link 1254. In various embodiments, resource selector 1216 comprises means for selecting the image source of display 1230, such as switching between the online bridged video stream provided by central computer 1240 and the local video stream provided by remote computer 1212 or generating a composite display image by combining concurrent local and online video streams. Resource selector 1216 further comprises means for switching device signals (such as USB, audio, BLUETOOTH or FIREWIRE peripheral device signals) to either remote computer 1212 or remote bridge 1214 for bridging to central computer 140.

Figure 13:
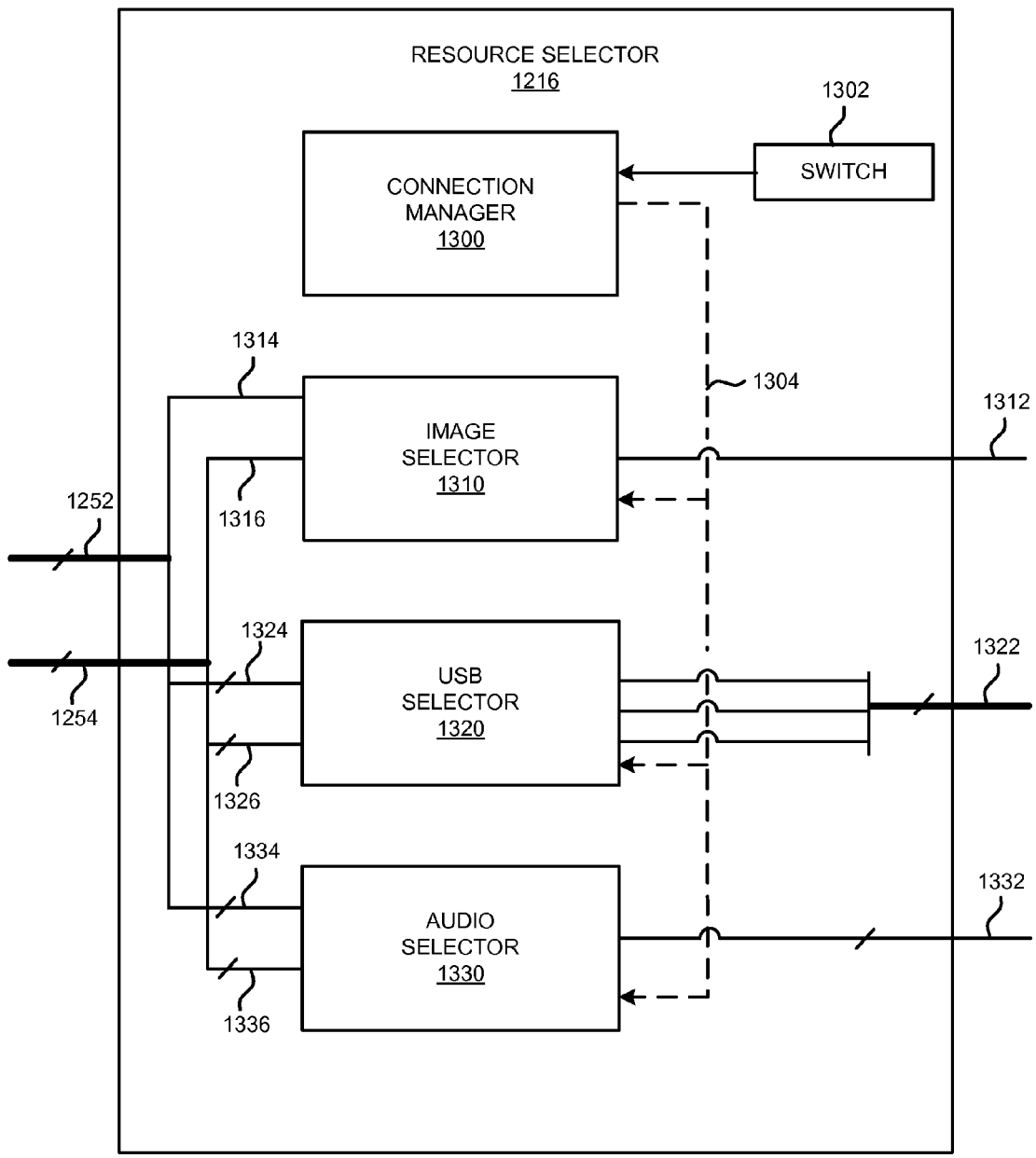
FIG. 13 illustrates selected details of an embodiment of a resource selector enabled to selectively couple a user interface to an online CPU sub-system, a remote computer.

In select embodiments, resource selector 1216 comprises connection management means for determining how user interface 1204 should be coupled (i.e., to remote computer 1212, to computer 1240 or both), for example evaluating the state of a selector switch on module 1210 or trapping a keyboard hotkey sequence from a keyboard device. In some embodiments, resource selector 1216 comprises means for selectively determining which UI devices should be coupled to remote computer 1212 and which devices should be coupled to computer 1240, for example by monitoring connection events and maintaining state information associated with previous connections. An embodiment of resource selector 1216 is depicted in FIG. 13 and described in the corresponding section of this specification.

When system 1200 is configured for online operation, remote bridge 1214 (substantially similar to remote bridge 114 of FIG. 3) couples user interface 1204 to a host bridge (substantially similar to host bridge 144 of FIG. 2) in central computer 1240 via switch 1218.

Switch 1218 comprises at least one network interface such as an RJ-45 Ethernet interface or antenna enabled to couple access module 1210 to network 1202 using a communication protocol such as a wired Ethernet variant or a suitable wireless protocol such as IEEE 802.11 or WIMAX. In some embodiments, such as system 1200 depicted, switch 1218 also comprises a second network connection (such as an RJ-45 interface or an IEEE 802.11 interface) for coupling remote computer 1212 to network 1202. In other embodiments, computer 1212 is coupled to network 1202 by a separate network connection In some embodiments, switch 1218 comprises an Ethernet switching device such as model number PI3L01D 10/100/1000 Copper multiplexer from PERICOM corporation. In other embodiments, switch 1218 comprises routing functions, for example as provided by a BROADCOM BCM53115 Gigabit Ethernet Switch device coupled to a router such as a BROADCOM BCM4717 802.11n router device, and well known support circuits.

Access module 1210 further includes support circuits 1250 comprising at least one of power supplies, clock circuits, data registers, I/O interfaces, address, control, interrupt and/or data connections, controllers, data buffers, drivers, repeaters, and receivers to enable appropriate communications between the various internal elements of access module (such as selector 1216, bridge 1214 and switch 1218) and external elements including UI 1204, remote computer 1212 and network 1202.

Remote computer 1212 is any of several non-portable or mobile computing apparatus including a desktop, laptop, tablet or handheld computer or other form of computing appliance enabled to operate offline and/or communicate with networked resources using a network 1202. In an exemplary embodiment, remote computer 1212 is a home computer manufactured by DELL, HP, APPLE or similar home computer configured to execute operating system, device drivers and application software, and further configured with a network interface and a set of device ports associated with UI link 1254, the device ports comprising one or more display interfaces (such as one or more DVI or DISPLAYPORT interfaces) and a set of USB peripheral device ports.

When system 1200 is configured for online operation, user interface 1204 is coupled to central computer 1240 by access module 1210 and network 1202. In various embodiments, network 1202 and central computer 1240 are substantially similar to network 102 and central computer 140 of FIG. 1 respectively.

System 1200 depicts just one combination of system architectures supported by the present invention and places no limitations on other contemplated configurations. For example, in various alternative embodiments, system 1200 comprises multiple remote computers 1212 coupled to access module 1210 or multiple central computers 1240 utilized for online computing.

FIG. 13 illustrates selected details of an embodiment of a resource selector enabled to selectively couple user interface 1204 of FIG. 12 to a central computer or a remote computer (ref. computers 1240 and 1212 in FIG. 12).

Connection Manager 1300 is a processing function performed by the likes of an embedded microcontroller or logic sequencer enabled to configure image selector 1310, USB selector 1320 and audio selector 1330 based on at least one of network status, a selector switch position or a peripheral devices event such as a keyboard hotkey sequence. In various embodiments connection manager 1300 is enabled to detect user connection preferences on selector switch 1302 and assert selection signal 1304 which configures the user interface connections according to host termination requirements. In some embodiments, at least part of connection manager 1300 is implemented by remote bridge 1214, for example as a function (such as machine readable instructions) that probe the availability of computer 1240 on network 1202 (ref. FIG. 12) before asserting selection signal 1304 for a bridged connection or defaulting to a connection between UI 1204 and remote computer 1212 (ref. FIG. 12). In one embodiment, connection manager 1300 is coupled to USB selector 1320 and receives user connection preferences from a keyboard device associated with UI 1204.

Image selector 1310 is enabled to connect one or more digital and/or analog source display signals to display connection 1312 which is coupled to one or more display devices of user interface 1204 in FIG. 12 (ref display 1230 in FIG. 12). In select embodiments, image selector 1310 comprises switches, as described for image selector 510 in FIG. 5, or image selector 600 in FIG. 6 enabled to switch or combine bridged display signal 1314 from remote bridge 1214 and display signal 1316 from remote computer 1212 (in FIG. 12).

USB selector 1320 is enabled to connect USB devices of user interface 1204 to USB busses from remote computer 1212 or USB busses associated with bridged USB signals from central computer 1240 (all depicted in FIG. 12). In select embodiments, USB selector 1320 comprises a USB multiplexer, as described for USB selector 520 of FIG. 5 enabled to switch either bridged USB bus set 1324 from remote bridge 1214, or USB bus set 1326 from remote computer 1212 to USB bus set 1322 which is coupled to one or more USB devices of user interface 1204 in FIG. 12.

Audio selector 1330 is enabled to select a termination host for one or more audio devices. In select embodiments, audio selector 1330 comprises an analog switch or multiplexer such as described for audio selector 530 in FIG. 5 or audio selector 710 in FIG. 7 enabled to switch or mix either bridged audio bundle 1334 from remote bridge 1214 or audio bundle 1336 from remote computer 1212 to audio 1332 which is coupled to one or more audio devices such as speakers 1236 and microphone 1238 of user interface 1204 in FIG. 12.

In various alternative embodiments, resource selector 1216 comprises one or more additional peripheral connection selectors such as selection functions that select FIREWIRE, BLUETOOTH, or PS/2 signals between user interface 1204 in FIG. 12 and either remote computer 1212 or central computer 1240 in FIG. 12.

Figure 14:
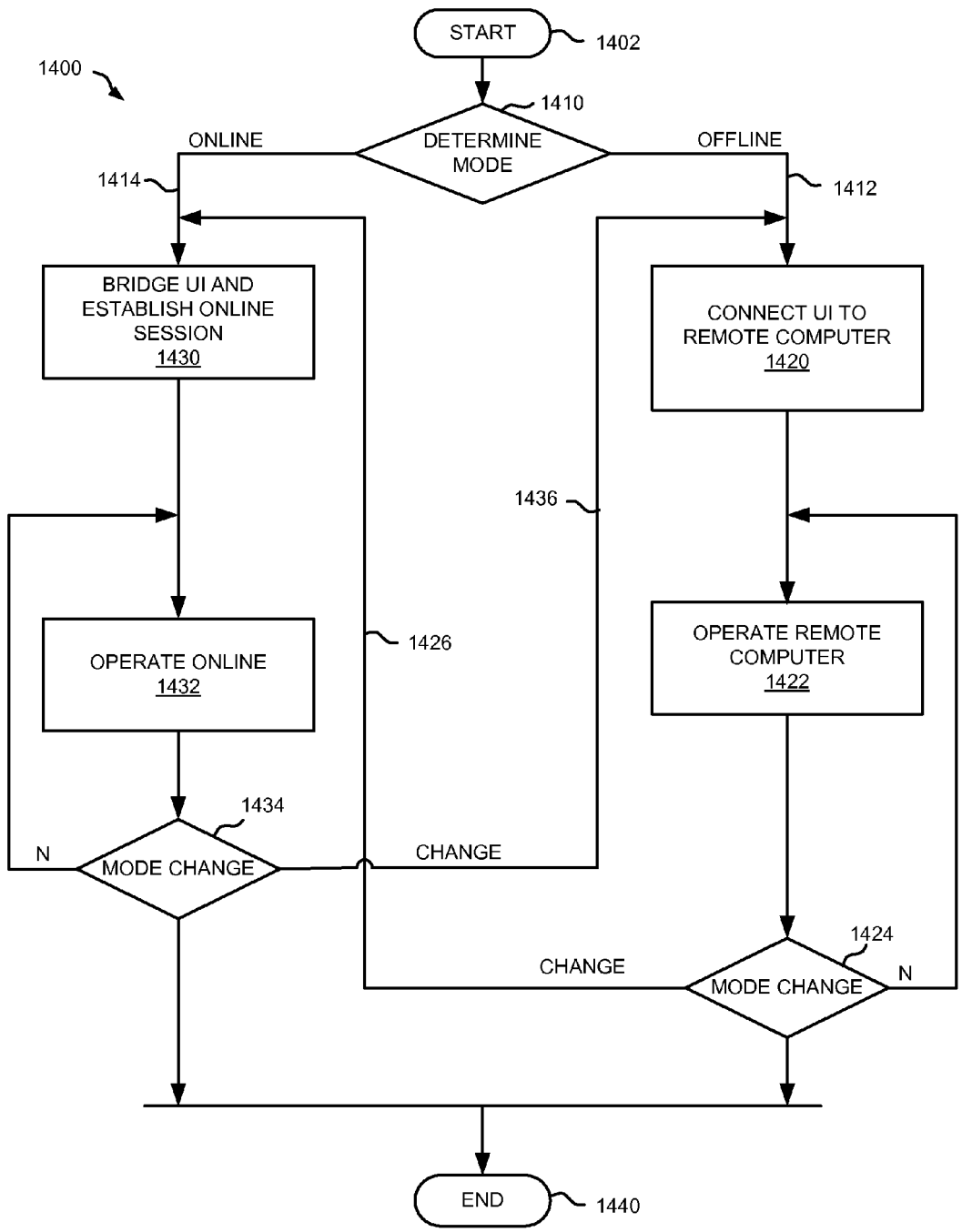
FIG. 14 illustrates an embodiment of a process for utilizing an access module to access at least one of a remote computer or a central computer by selectively coupling the user interface to the remote computer or bridging it to the central computer.

FIG. 14 illustrates an embodiment of a process for utilizing an access module such as module 1210 in FIG. 12 to access at least one of a remote computer or a central computer by selectively coupling the user interface to the remote computer or bridging it to the central computer.

Process 1400 starts ("Start" 1402) and proceeds to step 1410 ("Determine Mode"). According to some embodiments step 1410 comprises evaluating the setting of a selector switch, for example selector switch 1302 on access module 1210 in FIG. 13. In other embodiments, step 1410 comprises automatically establishing an online connection if a network connection and central computer are available. In other embodiments, the remote computer defaults to a connection to remote computer 1212 (FIG. 12) and an online connection is only established following a keyboard hotkey sequence. In other embodiments, the default mode and/or other authorized modes are determined by a management server on the network or an authorization key such as a USB dongle connected to a port of the user interface.

In case 1412, it is established that the user interface shall be coupled to the remote computer and process 1400 proceeds to step 1420 ("Connect user interface (UI) to Remote Computer"). Referring to system 1200 of FIG. 12, resource selector 1216 connects user interface 1204 to remote computer 1212, optionally booting the CPU or bringing the computer out of a sleep mode, for example by asserting a power signal.

Process 1400 proceeds to step 1422 ("Operate Remote Computer"). In various embodiments, step 1422 comprises executing an application runtime environment of computer 1212 in FIG. 12 with the computer coupled to user interface 1204.

Process 1400 continues to operate remote computer (step 1422) until a mode change is detected as step 1424 ("Mode Change"). In case 1426, access module 1210 (FIG. 12) initiates online operation by proceeding to step 1430, for example as determined by a selector switch or hotkey event. Process 1400 terminates as step 1440 ("End"), for example when the remote computer is powered down or hibernates.

In cases 1414 or 1426 where it is determined that the user interface shall operate in an online mode, process 1400 proceeds to step 1430 ("Bridge UI and establish online session"). Referring to system 1200 of FIG. 12, resource selector 1216 connects user interface 1204 to client bridge 1214. Client bridge 1214 established a session with a corresponding host bridge at central computer 1240, the session typically comprising a session management connection, one or more display connections, a USB connection associated with each USB device of user interface 1204 and an audio connection associated with each audio device of user interface 1204.

Process 1400 proceeds to step 1432 ("Operate Online"). In various embodiments, step 1432 comprises executing an online application environment utilizing computer 1240 in FIG. 12 bridged to user interface 1204.

Process 1400 continues to operate in online mode (step 1432) until a mode change is detected as step 1434 ("Mode Change"). In case 1436, the access module initiates operation of the remote computer by proceeding to step 1420, for example as determined by a selector switch, hotkey or loss of a network connection. Process 1400 terminates as step 1440 ("End"), for example when user interface 1204 is powered down.

In select embodiments, process 1400 enters a mixed mode following step 1410, similar to mixed mode process 1040 depicted in FIG. 11. As with cases 1412 and 1414, such a mixed mode is responsive to a selector switch setting, keyboard event, network availability or the like.

In some embodiments, various combinations of all or portions of functions performed by a computer (such as remote computer 110 or central computer 140 of FIG. 1) or access module (such as access module 1210 in FIG. 12), including remote bridge 114, host bridge 144 and resource selector 116 of FIG. 1 and further including remote bridge 1214 and resource selector 1216 of FIG. 12, and portions of a processor, a microprocessor, or a programmable controller providing all or portions of the aforementioned functions, are specified by descriptions compatible with processing by a computer system (e.g., Verilog, VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

While the foregoing is directed to embodiments of the present invention, other and further embodiments of the invention may be devised without departing from the basic scope thereof, and the scope thereof is determined by the claims that follow.

The invention claimed is:

1. A method of operating computing resources, the method comprising:
   executing a first application on a Central Processing Unit (CPU) system of a computer during an operation of the CPU system;
   controlling the execution of the first application by a user interface locally coupled to the computer and selectively further coupled to the CPU system by the computer;
   generating, by the first application and in response to an event from a user input device of the user interface, a first image for display on a display of the user interface;
   determining an operating mode during which the operation of the CPU system is suspended;
   controlling, by the user input device and during the suspension of the operation of the CPU system, an execution of a second application on a server coupled to the computer via an IP network, wherein the second application generates a second image that is compressed and transmitted as a compressed image by the server, and wherein the user interface is communicatively coupled to the server by a resource selector of the computer, a remote bridge of the computer and the IP network;
   receiving and decoding, via the remote bridge and during the suspension, the compressed image to generate a display image; and
   displaying the display image on the display, wherein the resource selector (i) mixes an ingress audio stream from the IP network with a local audio stream from the CPU system to generate a mixed audio output for a speaker of the user interface, (ii) combines an ingress video stream from the IP network with a local video stream from the CPU system to generate a combined image for the display, (iii) communicated audio content from a microphone of the user interface over the IP network and (iv) communicates video content from a webcam of the user interface over the IP network.

2. The method of claim 1, wherein controlling the execution of the first application comprises communicating a first event from the user input device to the first application; wherein controlling the execution of the second application comprises communicating a second event from the user input device to the second application, the second event comprising location information within the second image; and wherein the user input device comprises at least one of a mouse, a keyboard or a device mechanically integrated into an enclosure of the computer.

3. The method of claim 1, further comprising:
   generating a third image, by the first application and during the operation of the CPU system;
   receiving and decoding a second compressed image to generate a fourth image; and
   combining the second and the fourth images, by the resource selector, to generate a second display image displayed by the display.

4. The method of claim 1, wherein the user interface comprises (i) a Human Input Device (HID) and a printer coupled to the computer by a USB interface and (ii) the display coupled to the computer by a digital video bus, and wherein controlling the execution of the second application comprises printing content from the second application on the printer using USB Request Blocks (URBs) to communicate the content over the IP network.

5. The method of claim 1, wherein during the execution of the first application the resource selector determines an availability of the server and, in response to the availability of the server, changes operating modes from a first operating mode to the operating mode, wherein changing operating modes comprises (i) initiating control of the execution of the second application, wherein controlling the execution of the second application comprises communicating events from the user input device, subsequent to changing operating modes, to the second application, and (ii) suspending the CPU systems, wherein the CPU system comprises a CPU and a Graphics Processing Unit (GPU), and wherein suspending the CPU system comprises putting the CPU and the GPU into low power states.

6. The method of claim 1, further comprising:
during a concurrent operating mode, concurrently controlling the execution of the first application and controlling the execution of the second application; and
selectively routing, by the resource selector, information between devices of the user interface and the first and the second applications, wherein the resource selector is separate from the CPU system.

7. The method of claim 6, wherein a first device of the user interface is controlled by a first device driver operating on a first operating system of the CPU system, and wherein a second device of the user interface is controlled by a second device driver of a second operating system of the server.

8. The method of claim 1, wherein the first and the second applications are two equivalent applications generating equivalent content; and wherein controlling the execution of the second application and generating the display image consumes less power, by the computer, than the execution of the first application and generating the first image.

9. The method of claim 1, further comprising synchronizing data between the first application and the second application, wherein synchronizing the data comprises:
generating first data by the execution of the first application, wherein the first data (i) is stored in memory of the computer, the memory operational during the suspension, and (ii) is communicated with the second application during the suspension; and
generating second data by the execution of the second application, wherein the second data is stored in the memory during the suspension and communicated with the first application subsequent to an end of the suspension.

10. The method of claim 9, further comprising:
detecting, while controlling the execution of the second application over an IP session of the IP network, an end to the IP session; and
transitioning from controlling the execution of the second application to operating the first application, wherein transitioning from controlling the execution of the second application to operating the first application comprises synchronizing the data.

11. The method of claim 1, further comprising, during a mixed mode of concurrent operation and controlling the execution of both the first application and the second application, selectively coupling a peripheral device of the user interface to one of the first application or the second application based on a display focus, wherein (i) the display focus is based on a cursor location within a combination image comprising a third image from the CPU system and a fourth image from the server; (ii) executing the first application comprises the first application communicating with the peripheral device of the user interface through a first device driver operating on the CPU system, wherein the peripheral device is coupled to the computer by a USB interface; (iii) controlling the second application comprises the second application communicating with the peripheral device through a second device driver operating on the server, wherein the first device driver and the second device driver are equivalent and (iv) the second application communicating with the peripheral device comprises communicating USB Request Blocks (URBs) over the IP network.

12. The method of claim 1, wherein the computer is a mobile computer comprising one of a tablet computer or a handheld computer, and wherein the IP network comprises a wireless link from the computer, and wherein the user interface is mechanically integrated into an enclosure of the computer.

13. A computing resource comprising:
a computer comprising:
a resource selector comprising:
a display interface coupled to a display;
a device interface coupled to a user input device; and
a connection manager for selectively and operationally coupling the display interface and the device interface to (a) a CPU system of the computer and (b), via a remote bridge of the computer and independent of the CPU system, a server coupled to the computer by an IP network; wherein during an offline mode an application executing on the CPU system generates a first image, displayed on the display, in response to a first event from the user input device; wherein during an online mode the CPU system is suspended and the remote bridge (1) communicates a second event, as location information within the display, from the user input device to the server and (2) de-compresses, for display by the display, an encoded image received from the server; and wherein the remote bridge comprises an image media processor de-compressing the encoded image, wherein a webcam, a microphone and a speaker are mechanically integrated into a case of the computer and coupled to a plurality of device interfaces comprising the device interface and the display interface; and wherein the resource selector (i) mixes an ingress audio stream from the IP network with a local audio stream from the CPU system to generate a mixed audio output for the speaker, (ii) combines an ingress video stream from the IP network with a local video stream from the CPU system to generate a combined image for the display, (iii) communicated audio content from the microphone over the IP network and (iv) communicates video content from the webcam over the IP network.

14. The computing resource of claim 13, wherein the computer is a mobile computer communicatively coupled to the server via a wireless network, wherein (i) the online mode executes, on the server, an equivalent application in an equivalent state to the application, (ii) the first event is equivalent to the second event, (iii) a first delay from the first event to the display of the first image is longer than a second delay from the second event to a display of the de-compressed encoded image, and wherein the online mode consumes less power than the offline mode.

15. The computing resource of claim 13, wherein the plurality of device interfaces is further coupled to the remote bridge by the connection manager, wherein the remote bridge (i) compresses and transmits, over the IP network, egress media from the microphone and the webcam; and (ii) receives ingress media over the IP network and delivers a de-compression of the ingress media to the display and the speaker.

16. The computing resource of claim 15, wherein the resource selector communicates video and audio streams between the CPU system and the plurality of device interfaces during the offline mode and during a mixed mode, the mixed mode supporting selective mixing and routing of media streams between the plurality of device interfaces and (a) the remote bridge and (b) the CPU system.

17. The computing resource of claim 13, wherein a mixed mode supports concurrent operations of the remote bridge and the CPU system; and wherein the resource selector comprises (i) an image selector for selecting and combining images generated by the CPU system and images that are received from the server and de-compressed by the remote bridge; (ii) an audio selector for selecting and mixing audio generated by the CPU system and audio received from the server; and (iii) a USB selector for selectively coupling USB devices to device drivers of the CPU system or device drivers of the server, wherein selectively coupling the USB devices comprises communicating USB request blocks (URBs) between the server and a USB bus controller of the USB selector.

18. The computing resource of claim 13, further comprising a memory that is operational during the online mode and the offline mode, wherein the remote bridge communicates data between the application executing on the CPU system and a server application executing on the server, and wherein the data is stored in the memory during suspension of the CPU system or a disconnection of the computer with the server.

\* \* \* \* \*